(12) United States Patent
Monjur et al.

(10) Patent No.: US 12,200,449 B1
(45) Date of Patent: Jan. 14, 2025

(54) USER ORIENTATION ESTIMATION

(71) Applicant: Amazon Technologies, Inc., Seattle, WA (US)

(72) Inventors: Mahathir Monjur, Chapel Hill, NC (US); Mrudula V Athi, North Natick, MA (US); Md Tamzeed Islam, Stow, MA (US); Wontak Kim, Watertown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 18/081,477

(22) Filed: Dec. 14, 2022

(51) Int. Cl.
| | |
|---|---|
| *H04R 3/00* | (2006.01) |
| *G10L 15/02* | (2006.01) |
| *H04R 5/027* | (2006.01) |
| *H04S 3/00* | (2006.01) |
| *H04S 7/00* | (2006.01) |

(52) U.S. Cl.
CPC .............. *H04R 3/005* (2013.01); *G10L 15/02* (2013.01); *H04R 5/027* (2013.01); *H04S 3/008* (2013.01); *H04S 7/30* (2013.01); *H04S 2400/01* (2013.01); *H04S 2400/15* (2013.01)

(58) Field of Classification Search
CPC .... H04R 3/005; H04R 5/027; H04R 2201/40; H04S 7/303; G10L 15/02

USPC .......................................................... 381/92
See application file for complete search history.

(56) References Cited

U.S. PATENT DOCUMENTS

| | | | |
|---|---|---|---|
| 8,155,331 B2* | 4/2012 | Nakadai ................. | H04R 1/406 |
| | | | 700/258 |
| 10,824,921 B2* | 11/2020 | Bathiche ................ | G06V 20/40 |
| 11,617,035 B2* | 3/2023 | Meyer .................... | H04N 7/147 |
| | | | 381/92 |

\* cited by examiner

*Primary Examiner* — Disler Paul

(74) *Attorney, Agent, or Firm* — Pierce Atwood LLP

(57) ABSTRACT

A system configured to perform user orientation estimation to determine a direction a user is facing using a deep neural network (DNN). As a directionality of human speech increases with frequency, the DNN may estimate the user orientation by comparing high-frequency components detected by each of the multiple devices. For example, a group of devices may individually generate feature data, which represents audio features and spatial information, and send the feature data to the other devices. Thus, each device in the group receives feature data generated by the other devices and processes this feature data using a DNN to determine an estimate of user orientation. In some examples, the DNN may also generate sound source localization (SSL) data and/or a confidence score associated with the user orientation estimate. A post-processing step may process the individual user orientation estimates generated by the individual devices and determine a final user orientation estimate.

20 Claims, 18 Drawing Sheets

FIG. 1
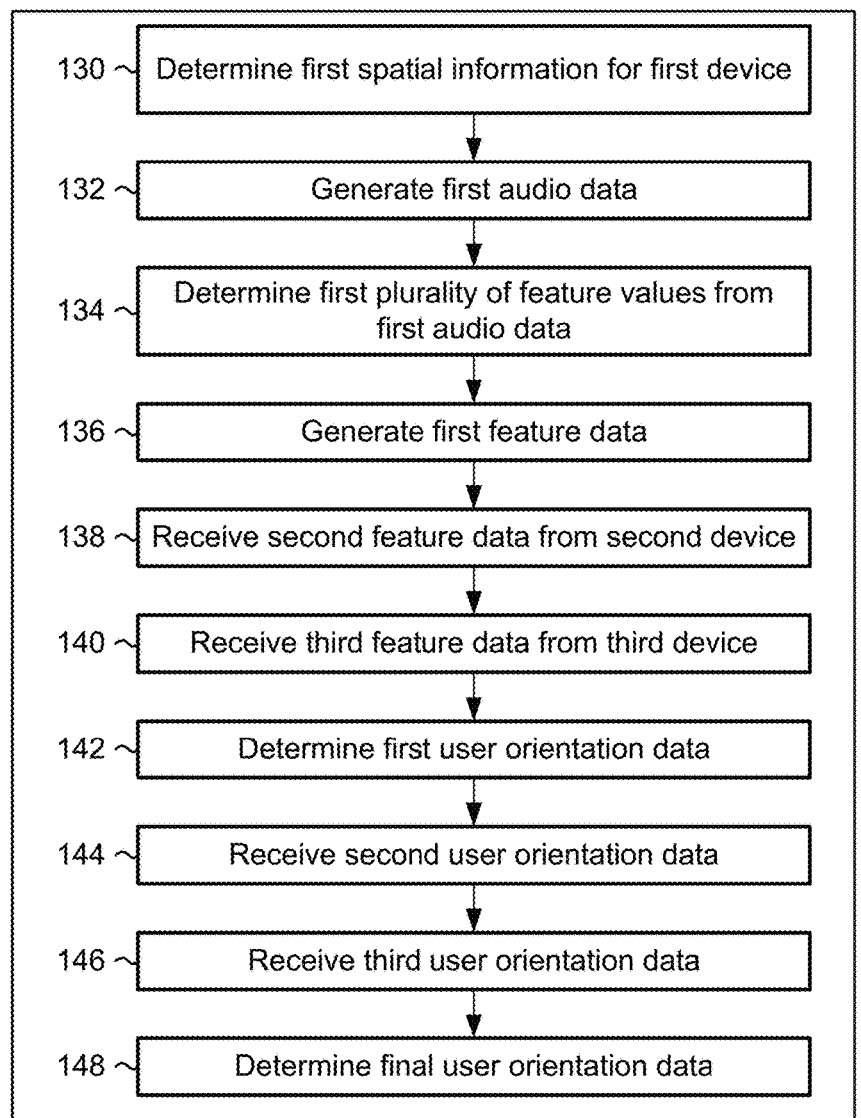
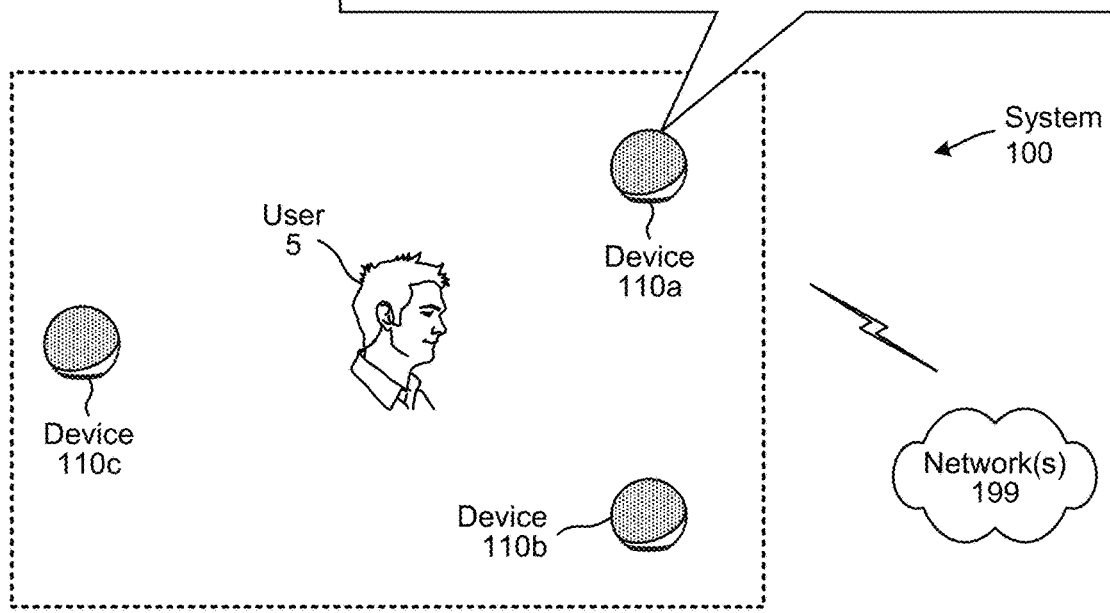

FIG. 7
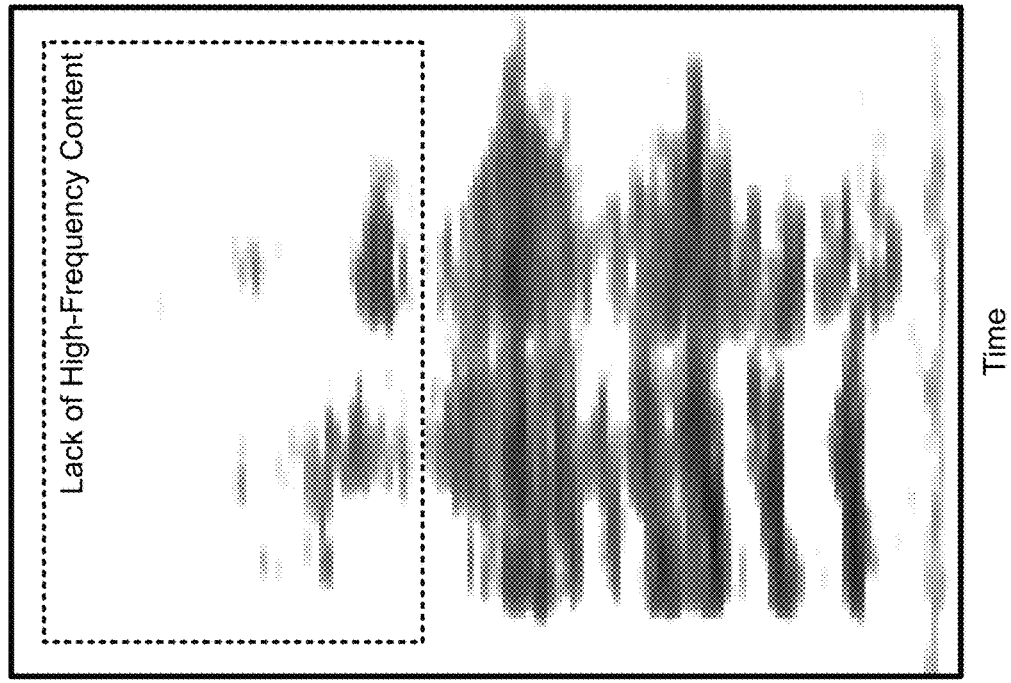
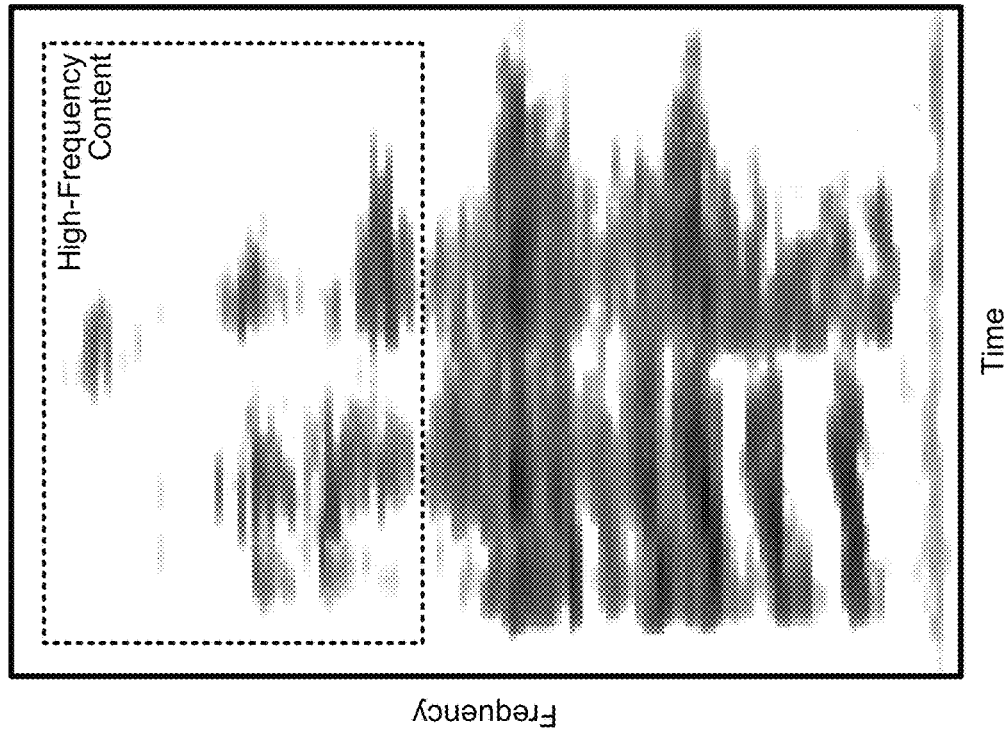

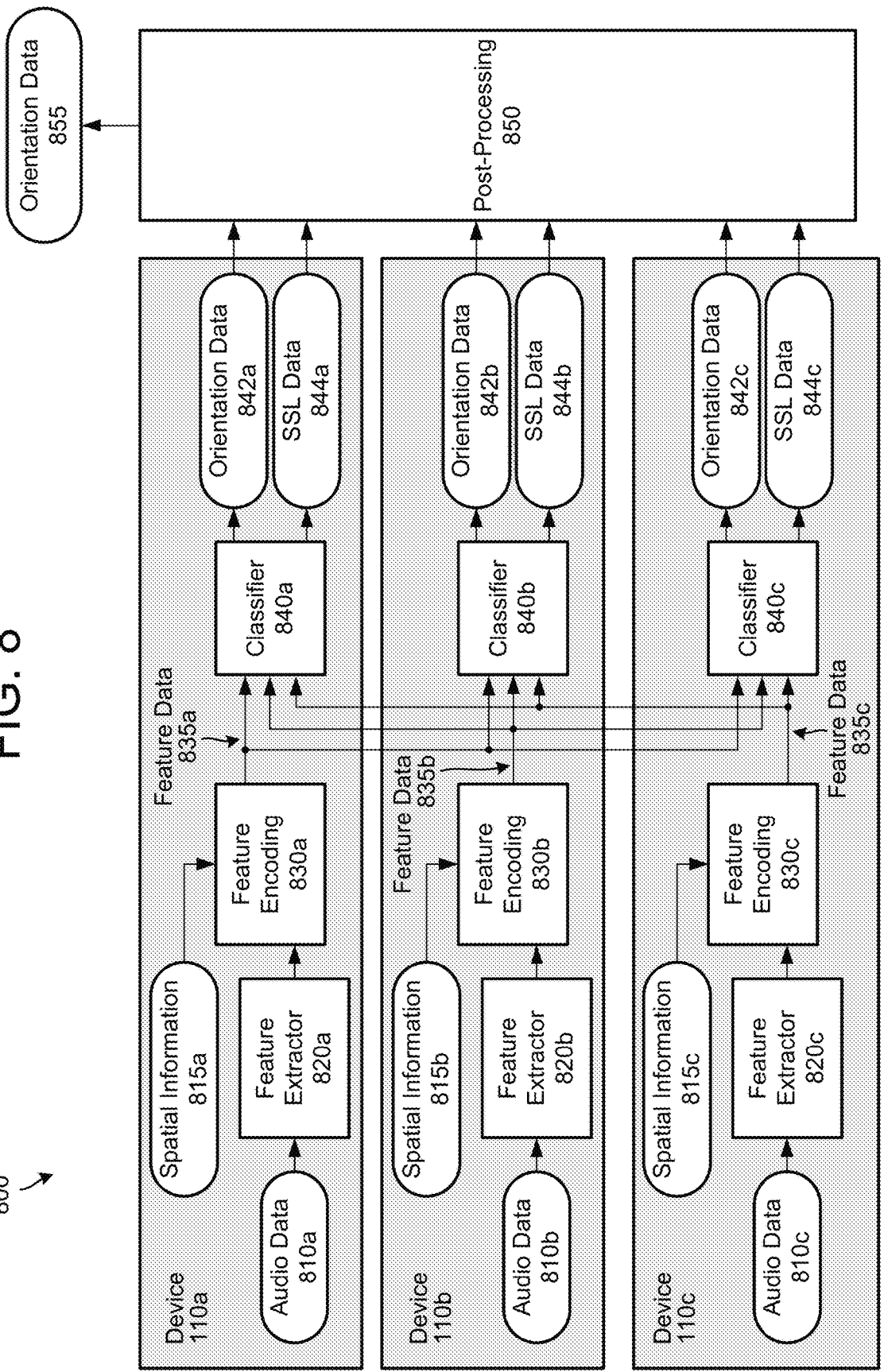

FIG. 11
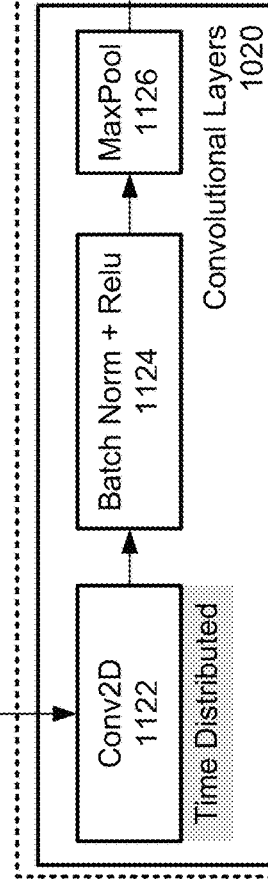
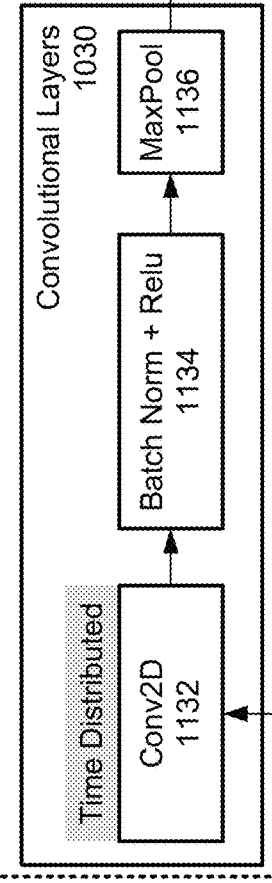
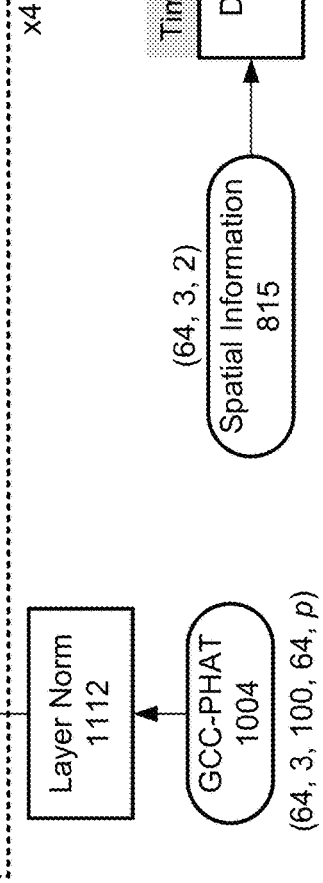
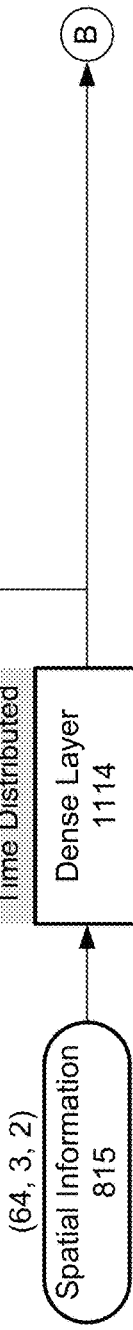

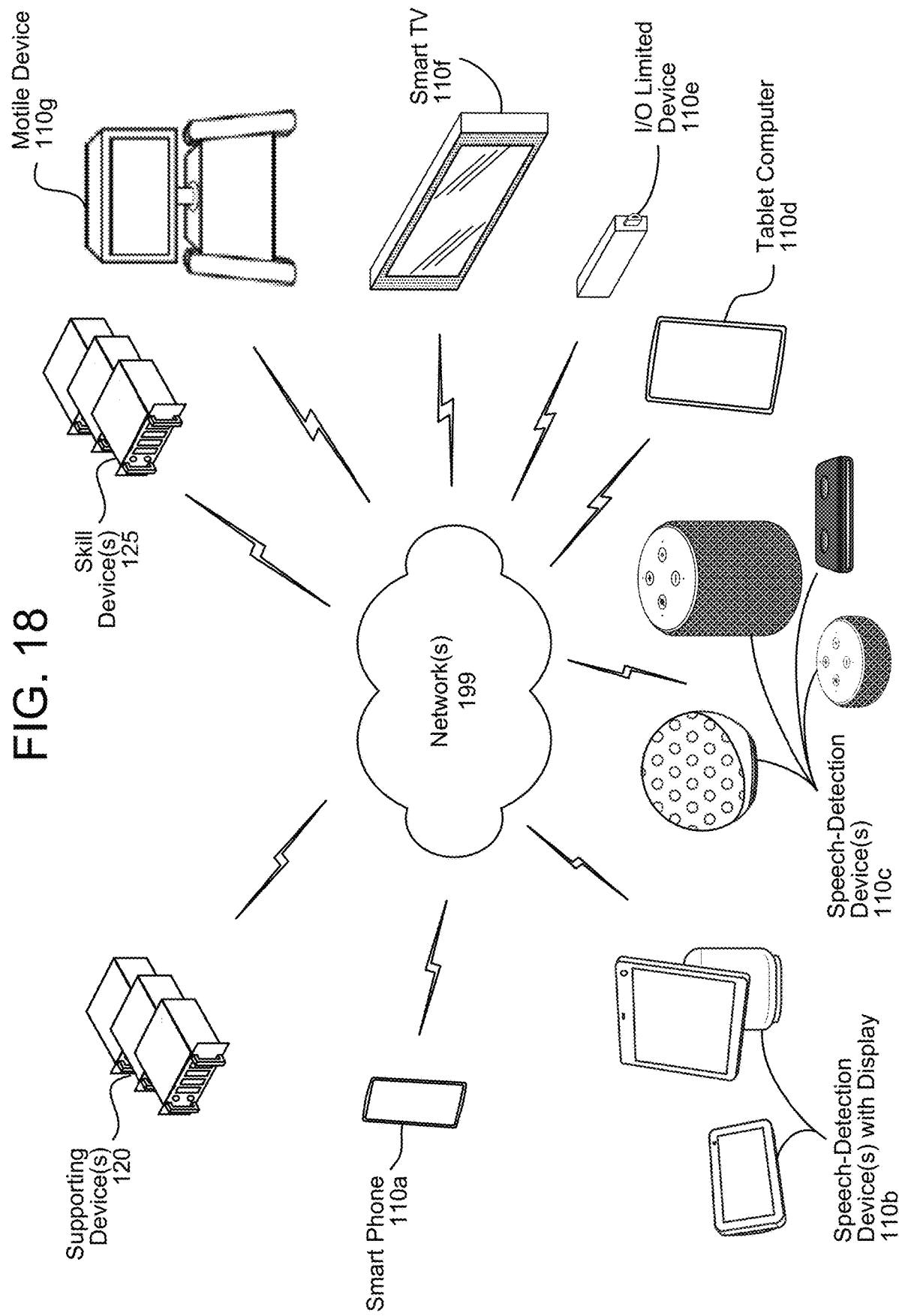

USER ORIENTATION ESTIMATION

BACKGROUND

With the advancement of technology, the use and popularity of electronic devices has increased considerably. Electronic devices are commonly used to process and output audio data.

BRIEF DESCRIPTION OF DRAWINGS

For a more complete understanding of the present disclosure, reference is now made to the following description taken in conjunction with the accompanying drawings.

FIG. 1 illustrates a system for performing user orientation estimation according to embodiments of the present disclosure.

FIG. 7 illustrates examples of frequency content associated with a front-facing device and a back-facing device according to embodiments of the present disclosure.

FIG. 8 is a conceptual diagram of components of a system to perform user orientation estimation according to embodiments of the present disclosure.

FIG. 11 is a conceptual diagram of components of feature encoding architecture configured to perform feature encoding according to embodiments of the present disclosure.

FIGS. 14A-14C illustrate examples of processing different types of devices according to embodiments of the present disclosure.

FIG. 18 illustrates an example of a computer network for use with the overall system, according to embodiments of the present disclosure.

DETAILED DESCRIPTION

Figure 2:
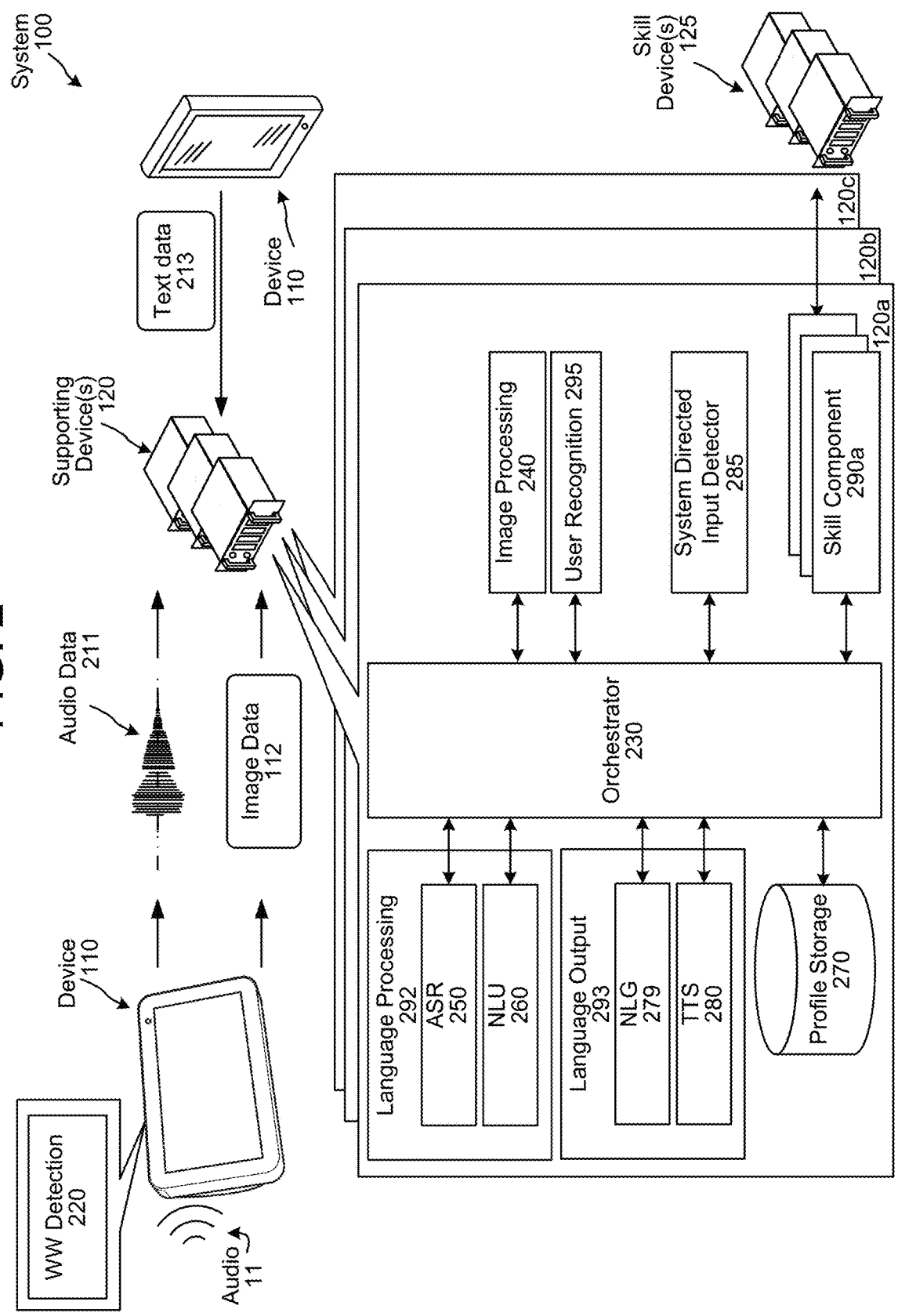
FIG. 2 is a conceptual diagram of components of the system, according to embodiments of the present disclosure.

Electronic devices may be used to capture audio and process audio data. The audio data may be used for voice commands and/or sent to a remote device as part of a communication session. As part of responding to a voice command from a particular user, the device may attempt to determine a direction of the user and/or a location of the user. For example, the device may perform sound source localization to distinguish between multiple sound sources represented in the audio data and determine a direction and/or location associated with the user. However, in many examples knowing only the location of the user is not adequate and estimating a direction that the user is facing (e.g., facing direction of the user) can enable a more seamless experience.

To determine the direction that a user is facing, a system may be configured to extract features using multiple devices and then process these features using a deep neural network (DNN) to perform user orientation estimation. As a directionality of human speech increases with frequency, the DNN may estimate the user orientation by comparing high-frequency components detected by each of the multiple devices. For example, a group of devices may individually generate feature data, which represents audio features and spatial information, and send the feature data to the other devices. Thus, each device in the group receives feature data generated by the other devices and processes this feature data using a DNN to determine an estimate of user orientation. In some examples, the DNN may also generate sound source localization (SSL) data and/or a confidence score associated with the user orientation estimate. A post-processing step may process the individual user orientation estimates generated by the individual devices and determine a final user orientation estimate.

FIG. 1 illustrates a system for performing user orientation estimation according to embodiments of the present disclosure. As illustrated in FIG. 1, a system 100 may include a first device 110a, a second device 110b, and a third device 110c configured to perform user orientation estimation, although the disclosure is not limited thereto. In some examples, the devices 110a-110c may communicate with each other and/or one or more supporting device(s) 120, which may be server devices, via network(s) 199. The network(s) 199 may be the Internet, a wide- or local-area network, and/or any other network, although the disclosure is not limited thereto.

The device 110 may receive audio corresponding to a spoken natural language input originating from a user 5. In some examples, the device 110 may process audio following detection of a wakeword. The device 110 may generate audio data 211 corresponding to the audio, and may send the audio data 211 to the supporting device(s) 120. The device 110 may send the audio data 211 to the supporting device(s) 120 via an application that is installed on the device 110 and associated with the supporting device(s) 120. An example of such an application is the Amazon Alexa application that may be installed on a smart phone, tablet, or the like. The device 110 may also receive output data from the supporting device(s) 120, and generate a synthesized speech output. The device 110 may include a camera for capturing image and/or video data for processing by the device 110, which is collectively referred to as image data 112.

Examples of various devices 110 are further illustrated in FIG. 18. The supporting device(s) 120 may be a group of computing components located geographically remote from device 110 but accessible via network 199 (for example, servers accessible via the internet). The supporting device(s) 120 may also be physically separate from device 110 but located geographically close to device 110 and accessible via network 199 (for example a home server located in a same residence as device 110. The supporting device(s) 120 may also include some combination thereof, for example where certain components/operations are performed via a home server(s) and others are performed via a geographically remote server(s).

While not illustrated in FIG. 1, in some examples the first device 110*a* may generate sound source localization (SSL) data. The SSL data may indicate a direction associated with one or more sound sources and/or when the sound source is active (e.g., when the first device 110*a* detected the sound source). For example, the first device 110*a* may associate a first sound source with a first direction and the SSL data may include a first portion that indicates that the first sound source is detected during a first time window.

In some examples, the first device 110*a* may include acoustic event detectors, a wakeword engine, and/or the like, which may be configured to detect an acoustic event like speech or an individual keyword represented in the speech. Using acoustic event detectors, the first device 110*a* may identify a sound source represented in the SSL data that corresponds to the speech, enabling the first device 110*a* to use the SSL data to determine a direction associated with the speech and/or a location of the user.

In addition to determining the location of the user, the devices 110*a*-110*c* may perform device localization to determine relative positions of the devices 110*a*-110*c*. In some examples, the system 100 may perform device localization to generate a device map indicating relative positions of multiple devices 110. For example, the system 100 may generate map data indicating the locations of the devices 110, the type of devices 110, and/or other context (e.g., number of loudspeakers, frequency response of the drivers, etc.). To perform user orientation estimation, the system 100 may convert the map data into spatial information that can be input to a trained model along with the audio data and/or audio features. For example, the spatial information may provide the trained model with an overview of the device map relative to the user location, with relative distances and/or relative angles for each device 110 that is used to perform user orientation estimation.

As illustrated in FIG. 1, the first device 110*a* may determine (130) first spatial information associated with the first device 110*a*. In order to convey the relative positions of the devices 110*a*-110*c* to the trained model, the system 100 may convert the map data into spatial information. In some examples, the system 100 may determine which of the three devices 110*a*-110*c* is closest to a user location associated with the user 5 and may generate the spatial information using the closest device as a reference point. For example, the system 100 may determine that the first device 110*a* is closest to the user location and may select a first position of the first device 110*a* as a reference point with which to generate the spatial information. Thus, in this example, the first spatial information may associate the first device 110*a* with a first location $[r=1, \theta=0°]$. While not illustrated in FIG. 1, the system 100 may normalize the distances between the user 5 and the second device 110*b* and/or the third device 110*c* based on a first distance from the user 5 to the first device 110*a*. Similarly, the system 100 may measure azimuth values associated with the devices 110*b*-110*c* relative to a first azimuth value associated with the first device 110*a*.

The first device 110*a* may generate (132) first audio data in a time domain, may determine (134) a first plurality of feature values from the first audio data, and may generate (136) first feature data corresponding to the first plurality of feature values. In some examples, the first device 110*a* may convert the first audio data from the time domain to a frequency domain, as described in greater detail below, and may extract a first plurality of features from the first audio data. For example, a first subset of the first plurality of features may correspond to magnitude values of the first audio data in the frequency domain. In addition, a second subset of the first plurality of features may be determined by calculating generalized cross-correlation values representing phase information of the first audio data. This phase information may be a useful feature for the trained model, as the phase information may vary depending on whether the user is facing the first device 110*a*. The first device 110*a* may generate the first feature data using the first plurality of feature values and the first spatial information.

The first device 110*a* may receive (138) second feature data from the second device 110*b* and may receive (140) third feature data from the third device 110*c*. For example, the second device 110*b* and the third device 110*c* may generate the second feature data and the third feature data by performing steps similar to steps 130-136. While not illustrated in FIG. 1, the first device 110*a* may also send the first feature data to the second device 110*b* and the third device 110*c*.

As will be described in greater detail below with regard to FIG. 8, the first device 110*a* may determine (142) first user orientation data using the first feature data, the second feature data, and the third feature data. For example, the first device 110*a* may process the combined feature data using a trained model, a deep neural network (DNN), and/or the like to generate the first user orientation data. The first user orientation data corresponds to a first estimate of the user's orientation made by the first device 110*a*. For example, the first estimate of the user's orientation may indicate that the user is facing a first direction relative to a coordinate system (e.g., look direction of the user). In some examples, the first estimate may indicate the user's orientation with reference to a second direction of the first device relative to the user, as described in greater detail below with regard to FIG. 9A.

As illustrated in FIG. 1, the first device 110*a* may receive (144) second user orientation data from the second device 110*b* and may receive (146) third user orientation data from the third device 110*c*. For example, the second user orientation data corresponds to a second estimate of the user's orientation made by the second device 110*b* and the third user orientation data corresponds to a third estimate of the user's orientation made by the third device 110*c*. Finally, the first device 110*a* may determine (148) final user orientation data using the first user orientation data, the second user orientation data, and/or the third user orientation data, as described in greater detail below with regard to FIGS. 8-9B.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

In some examples, the device 110 may generate microphone audio data $z(t)$ using microphone(s). For example, a first microphone may generate first microphone audio data $z_1(t)$ in the time-domain, a second microphone may generate second microphone audio data $z_2(t)$ in the time-domain, and so on. Thus, a time-domain signal may be represented as microphone audio data $z(t)$, which is comprised of a sequence of individual samples of audio data. Thus, $z(t)$ denotes an individual sample that is associated with a time t. While the microphone audio data $z(t)$ is comprised of a plurality of samples, in some examples the device 110 may group a plurality of samples and process them together. For example, the device 110 may group a number of samples together in a frame to generate microphone audio data $z(n)$. As used herein, a variable $z(n)$ corresponds to the time-domain signal and identifies an individual frame (e.g., fixed number of samples s) associated with a frame index n.

In some examples, the device 110 may convert microphone audio data $z(t)$ from the time-domain to the subband-domain. For example, the device 110 may use a plurality of bandpass filters to generate microphone audio data $z(t, k)$ in the subband-domain, with an individual bandpass filter centered on a narrow frequency range. Thus, a first bandpass filter may output a first portion of the microphone audio data $z(t)$ as a first time-domain signal associated with a first subband (e.g., first frequency range), a second bandpass filter may output a second portion of the microphone audio data $z(t)$ as a time-domain signal associated with a second subband (e.g., second frequency range), and so on, such that the microphone audio data $z(t, k)$ comprises a plurality of individual subband signals (e.g., subbands). As used herein, a variable $z(t, k)$ corresponds to the subband-domain signal and identifies an individual sample associated with a particular time t and tone index k.

For ease of illustration, the previous description illustrates an example of converting microphone audio data $z(t)$ in the time-domain to microphone audio data $z(t, k)$ in the subband-domain. However, the disclosure is not limited thereto, and the device 110 may convert microphone audio data $z(n)$ in the time-domain to microphone audio data $z(n, k)$ the subband-domain without departing from the disclosure.

Additionally or alternatively, the device 110 may convert microphone audio data $z(n)$ from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data $Z(n, k)$ in the frequency-domain. As used herein, a variable $Z(n, k)$ corresponds to the frequency-domain signal and identifies an individual frame associated with frame index n and tone index k. The microphone audio data $z(t)$ may correspond to time indexes, whereas the microphone audio data $z(n)$ and the microphone audio data $Z(n, k)$ may correspond to frame indexes.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data $Z(n)$. However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

In some examples, the device 110 may convert from microphone audio data $z(t)$ or microphone audio data $z(n)$ in the time-domain to microphone audio data $Z(n, k)$ in the frequency-domain. For example, the system 100 may apply FFT processing to the time-domain microphone audio data $z(n)$, producing the frequency-domain microphone audio data $Z(n, k)$, where the tone index "k" (e.g., frequency index) ranges from 0 to K and "n" is a frame index ranging from 0 to N. In addition, the history of the values across iterations is provided by the frame index "n", which ranges from 1 to N and represents a series of samples over time.

The device 110 may perform a K-point FFT on a time-domain signal. For example, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. Thus, each tone index in the 256-point FFT corresponds to a frequency range (e.g., subband) in the 16 kHz time-domain signal. In some examples, the frequency range may be divided into 256 different frequency ranges (e.g., tone indexes), although the disclosure is not limited thereto and the system 100 may divide the frequency range into K different frequency ranges (e.g., K indicates an FFT size). While the tone index may be generated using a Fast Fourier Transform (FFT), the disclosure is not limited thereto. Instead, the tone index may be generated using Short-Time Fourier Transform (STFT), generalized Discrete Fourier Transform (DFT) and/or other transforms known to one of skill in the art (e.g., discrete cosine transform, non-uniform filter bank, etc.).

In some examples, the frame indexes may correspond to a series of distinct audio frames, but the disclosure is not limited thereto. In other examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

The system 100 may use computer vision (CV) techniques operating on image data to determine whether speech is device directed. The system 100 may thus use image data to determine when a user 5 is speaking and/or which user is speaking. The system 100 may use face detection techniques to detect a human face represented in image data. The system 100 may use a classifier or other model configured to determine whether a face is looking at a device 110. The system 100 may also be configured to track a face in image data to understand which faces in the video are belonging to the same person and where they may be located in image data and/or relative to a device 110. The system 100 may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement).

The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

To improve dialog processing, a system may be configured with a multi-user dialog (MUD) mode that allows the system to participate in a dialog with multiple users. As part of this mode (or operating in a normal mode using multi-user dialog components/operations) the system may be configured to identify when a user is speaking to the system and respond accordingly. The system may also be configured to identify when a user is speaking with another user and determine that such user-to-user speech does not require system action and so the system can ignore such speech. The system may also be configured to identify when a user is speaking with another user and determine when such user-to-user speech is relevant to the system such that it is appropriate for the system to interject or respond to the user-to-user speech with information that is relevant to the user, as if the system were a participant in a conversation. The system may also be configured to maintain a natural pace during a conversation and to insert conversational cues (such as "uh huh," "mm," or the like) to indicate to the user that the system is maintaining a connection with the user(s) for purposes in participating in the dialog. The system may use models configured to make such determinations based on audio data, image data showing the user(s) and other information. The system may also be configured to discontinue a multi-user dialog mode upon indication by the user, timeout, or other condition.

The system may use computer vision (CV) techniques operating on image data (for example in a multi-user scenario) to determine whether a particular input (for example speech or a gesture) is device directed. The system may thus use image data to determine when a user is speaking to the system or to another user. The system may start conversing with one person, and switch to a second person when the second person gives a visual indication that they are about to talk to the system. Such a visual indication may include, for example, raising a hand, turning to look from another user to look at a device 110, or the like. To make such determinations the system may use face detection techniques to detect a human face represented in image data (for example using an object detection component). The system may use a classifier or other model configured to determine whether a face is looking at a device 110 (for example using an object tracking component). The system may also be configured to track a face in image data to understand which faces in the video are belonging to the same person and where they may be located in image data and/or relative to a device 110 (for example using user recognition component 295). The system may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement). The system may use components such as user recognition component 295, and/or other components to perform such operations. To determine whether speech or another input is system directed, the system may use the above information as well as techniques described below in reference to system directed input detector 285/385.

Beamforming and/or other audio processing techniques may also be used to determine a voice's direction/distance relative to the device 110. Such audio processing techniques, in combination with image processing techniques may be used (along with user identification techniques or operations such as those discussed below) may be used to match a voice to a face and track a user's voice/face in an environment of the device 110 whether a user appears in image data (e.g., in the field of view of a camera 1618 of a device 110) or whether a user moves out of image data but is still detectable by the system 100 through audio data of the user's voice (or other data).

The system may also be configured to discern user-to-user speech and determine when it is appropriate for the system to interject and participate in such a conversation and when it is appropriate for the system to allow the users to converse without interjecting/participating. The system may be configured to provide personalized responses and proactively participate in a conversation, even when the system is not directly addressed. The system may determine (in natural turn taking mode) when users are talking to each other, determine whether these are simply sidebar conversations or if they are relevant to the ongoing conversation with the system (for example relevant to the subject of a system-involved dialog), and may proactively interject with helpful information that is personalized and directed to the user addressed by the system. Such operations may allow the system to function as an equal participant in a multi-party conversation. To allow for such operations the system may be configured for discourse understanding as part of natural language understanding (NLU) and dialog management as described below, for example in reference to NLU component 260 and dialog manager.

The system may also be configured to allow a natural pace during a conversation. The system may include component(s) to allow the system to "backchannel" during gaps in a conversation/dialog and to process breaks and turns within a conversation. For example, the system may be configured to encourage a user to continue speaking by insertion of turn holding cues such as uh, mm, or utterances that are pragmatically and syntactically incomplete followed by a silence. This allows the system to not interrupt a user's flow of the thought and gives the user sufficient time to respond. A classifier or other model may be configured to take into account turn holding cues as part of a spoken interaction between the system and a user. Such a classifier may be included in (and such operations may be managed by) one or more system components, for example dialog manager, language output component 293, or other component(s). The system may be configured to input audio data, image data, and other data to consider acoustic cues, prosody and other intonation classifications, as well as computer-vision features discussed herein. For example, if there is a silence that is classified as a pause, the system may returns an empty TTS response and continue to "listen." After an extended silence, the system may return uh huh, ok, hmm, right, yeah, etc. to encourage a user to continue talking. Such backchannel expressions the system's attention to the user without interruption of the user. For example when a user is adding elements to a list, the system may insert a backchannel indication in a gap after an utterance with the anticipation that more elements might get added by the user. This gives the customer more time while being reminded that the system is waiting and so encourages more participation from them or other parties in the conversation. The system may be trained to recognize such conversational components using simulated and model utterances which are syntactically and pragmatically incomplete. The system may also be trained using simulated syntactic incompleteness with utterances including pauses randomly included at the end of phrases within the utterance. The system may also be trained using simulated pragmatic incompleteness with utterances including pauses before all entities that are requested to be updated are provided.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 100. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1618 of the device 110 and may send image data 112 representing those image(s) to the supporting device(s) 120. The image data 112 may include raw image data or image data processed by the device 110 before sending to the supporting device(s) 120. The image data 112 may also include individual still images and/or a video feed of multiple images.

The wakeword detector 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by an input detector, the device 110 may "wake" and begin transmitting audio data 211, representing the audio 11, to the supporting device(s) 120. The audio data 211 may include data corresponding to the wakeword; in other embodiments, the portion of the audio corresponding to the wakeword is removed by the device 110 prior to sending the audio data 211 to the supporting device(s) 120. In the case of touch input detection or gesture based input detection, the audio data may not include a wakeword.

In some implementations, the system 100 may include more than one supporting device(s) 120. The supporting device(s) 120 may respond to different wakewords and/or perform different categories of tasks. Each supporting device(s) 120 may be associated with its own wakeword such that speaking a certain wakeword results in audio data be sent to and processed by a particular system. For example, detection of the wakeword "Alexa" by the wakeword detector 220 may result in sending audio data to supporting device(s) 120a for processing while detection of the wakeword "Computer" by the wakeword detector may result in sending audio data to supporting device(s) 120b for processing. The system may have a separate wakeword and system for different skills (e.g., "Dungeon Master" for a game play skill/supporting device(s) 120c) and/or such skills may be coordinated by one or more skill(s) 290 of one or more supporting device(s) 120.

Upon receipt by the supporting device(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the supporting device(s) 120, a skill component 290, skill device(s) 125, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora/a contextual reference such as "this song" or "my next appointment"—the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

The NLU component 260 may return NLU results data 985/925 (which may include tagged text data, indicators of intent, etc.) back to the orchestrator 230. The orchestrator 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 985/925 includes an N-best list of NLU hypotheses, the NLU component 260 and the orchestrator component 230 may direct the top scoring NLU hypothesis to a skill component(s) 290 associated with the top scoring NLU hypothesis A skill component may be software running on the supporting device(s) 120 that is akin to a software application. That is, a skill component 290 may enable the supporting device(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The supporting device(s) 120 may be configured with more than one skill component 290. For example, a weather service skill component may enable the supporting device(s) 120 to provide weather information, a car service skill component may enable the supporting device(s) 120 to book a trip with respect to a taxi or ride sharing service, a restaurant skill component may enable the supporting device(s) 120 to order a pizza with respect to the restaurant's online ordering system, etc. A skill component 290 may operate in conjunction between the supporting device(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

Skill device(s) 125 may communicate with a skill component(s) 290 within the supporting device(s) 120 and/or directly with the orchestrator component 230 or with other components. Skill device(s) 125 may be configured to perform one or more actions. An ability to perform such action(s) may sometimes be referred to as a "skill." That is, a skill may enable skill device(s) 125 to execute specific functionality in order to provide data or perform some other action requested by a user. For example, a weather service skill may enable skill device(s) 125 to provide weather information to the supporting device(s) 120, a car service skill may enable skill device(s) 125 to book a trip with respect to a taxi or ride sharing service, an order pizza skill may enable skill device(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The supporting device(s) 120 may be configured with a skill component 290 dedicated to interacting with the skill device(s) 125. Unless expressly stated otherwise, reference to a skill, skill device, or skill component may include a skill component 290 operated by the supporting device(s) 120 and/or skill operated by the skill device(s) 125. Moreover, the functionality described herein as a skill or skill may be referred to using many different terms, such as an action, bot, app, or the like. The skill 290 and or skill device(s) 125 may return output data to the orchestrator 230.

The system(s) 100 may include a dialog manager component that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component may associate a dialog session identifier with the dialog upon identifying that the user is engaging in a dialog with the user. The dialog manager component may track a user input and the corresponding system generated response to the user input as a turn. The dialog session identifier may correspond to multiple turns of user input and corresponding system generated response. The dialog manager component may transmit data identified by the dialog session identifier directly to the orchestrator component 230 or other component. Depending on system configuration the dialog manager may determine the appropriate system generated response to give to a particular utterance or user input of a turn. Or creation of the system generated response may be managed by another component of the system (e.g., the language output component 293, NLG 279, orchestrator 230, etc.) while the dialog manager selects the appropriate responses. Alternatively, another component of the supporting device(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager may receive the ASR hypothesis/hypotheses (i.e., text data) and make a semantic interpretation of the phrase(s) or statement(s) represented therein. That is, the dialog manager determines one or more meanings associated with the phrase(s) or statement(s) represented in the text data based on words represented in the text data. The dialog manager determines a goal corresponding to an action that a user desires be performed as well as pieces of the text data that allow a device (e.g., the device 110, the supporting device(s) 120, a skill 290, skill device(s) 125, etc.) to execute the intent. If, for example, the text data corresponds to "what is the weather," the dialog manager may determine that that the supporting device(s) 120 is to output weather information associated with a geographic location of the device 110. In another example, if the text data corresponds to "turn off the lights," the dialog manager may determine that the supporting device(s) 120 is to turn off lights associated with the device(s) 110 or the user(s) 5.

The dialog manager may send the results data to one or more skill(s) 290. If the results data includes a single hypothesis, the orchestrator component 230 may send the results data to the skill(s) 290 associated with the hypothesis. If the results data includes an N-best list of hypotheses, the orchestrator component 230 may send the top scoring hypothesis to a skill(s) 290 associated with the top scoring hypothesis.

The supporting device(s) 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data discussed below). Alternatively or in addition, the TTS component 280 may receive text data from a skill 290 or other system component for output.

The NLG component 279 may include a trained model. The NLG component 279 generates text data from dialog data received by the dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the supporting device(s) 120 as image data. The device 110 may further include circuitry for voice command-based control of the camera, allowing a user 5 to request capture of image or video data. The device 110 may process the commands locally or send audio data 211 representing the commands to the supporting device(s) 120 for processing, after which the supporting device(s) 120 may return output data that can cause the device 110 to engage its camera.

Upon receipt by the supporting device(s) 120, the image data 112 may be sent to an orchestrator component 230. The orchestrator component 230 may send the image data 112 to an image processing component 240. The image processing component 240 can perform computer vision functions such as object recognition, modeling, reconstruction, etc. For example, the image processing component 240 may detect a person, face, etc. (which may then be identified using user recognition component 295). The image processing component 240 is described in greater detail below with regard to FIG. 5. The device 110 may also include an image processing component 340 which operates similarly to image processing component 240.

In some implementations, the image processing component 240 can detect the presence of text in an image. In such implementations, the image processing component 240 can recognize the presence of text, convert the image data to text data, and send the resulting text data via the orchestrator component 230 to the language processing component 292 for processing by the NLU component 260.

The supporting device(s) 120 may include a user recognition component 295 that recognizes one or more users using a variety of data, as described in greater detail below with regard to FIGS. 16-17. However, the disclosure is not limited thereto, and the device 110 may include a user recognition component 395 instead of and/or in addition to user recognition component 295 of the supporting device(s) 120 without departing from the disclosure. User recognition component 395 operates similarly to user recognition component 295.

The user recognition component 295 may take as input the audio data 211 and/or text data output by the ASR component 250. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users assuming user permission and previous authorization. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art.

The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may also be configured to determine (or assist another component in determining) that a particular voice matches a particular face for purposes of user identification and/or following a user in an environment if the user is not visible in image data).

Output of the user recognition component 295 may include a single user identifier corresponding to the most likely user that originated the user input. Alternatively, output of the user recognition component 295 may include an N-best list of user identifiers with respective scores indicating likelihoods of respective users originating the user input. The output of the user recognition component 295 may be used to inform NLU processing as well as processing performed by other components of the system.

The system 100 (either on device 110, supporting device(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various data (not illustrated separately) corresponding to a user/group of the profile. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the supporting device(s) 120 with permission to allow the skill to execute with respect to the user's natural language user inputs. If a user does not enable a skill, the supporting device(s) 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 3:
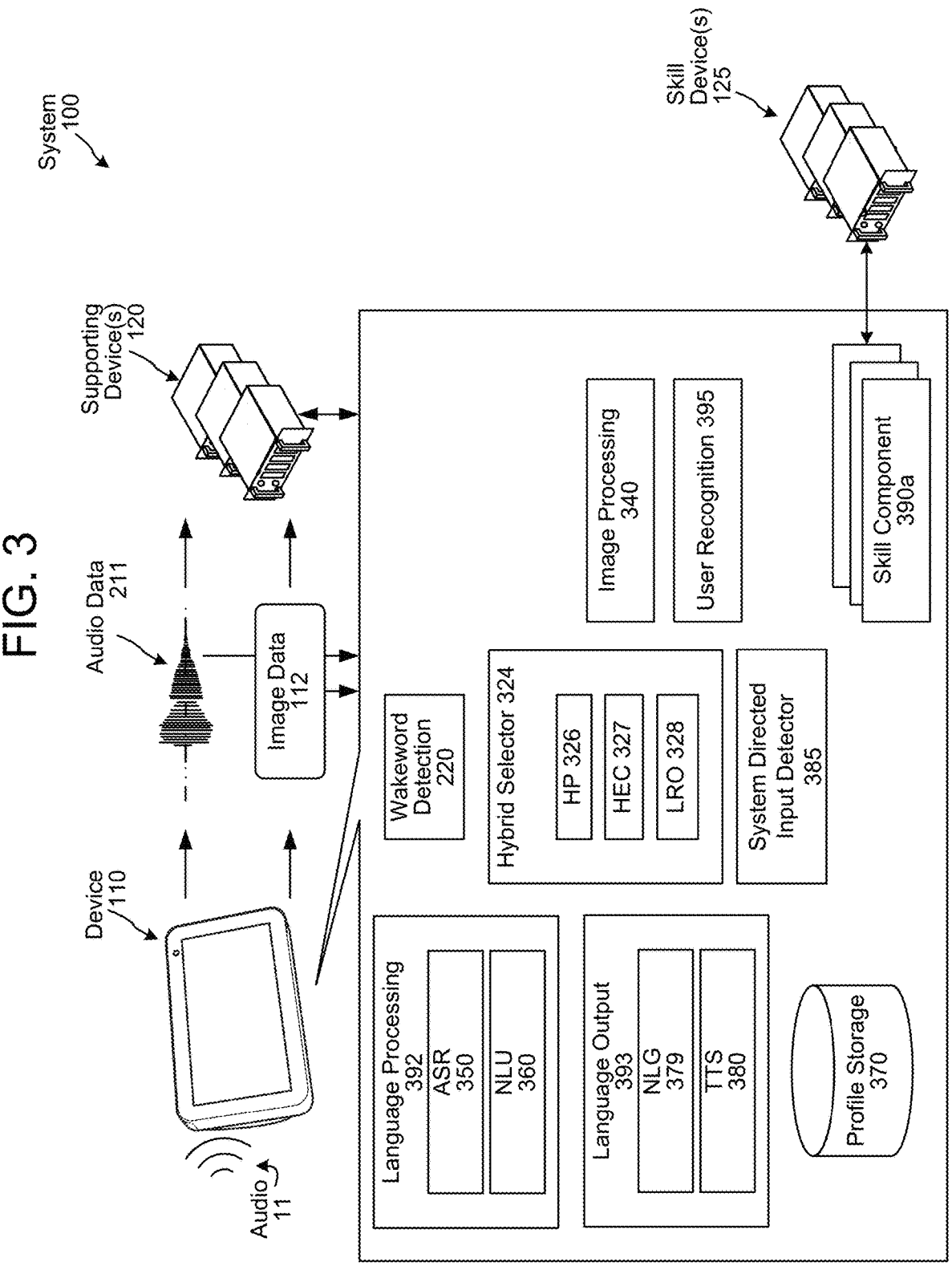
FIG. 3 is a conceptual diagram illustrating components that may be included in a device, according to embodiments of the present disclosure.

Although the components of FIG. 2 may be illustrated as part of supporting device(s) 120, device 110, or otherwise, the components may be arranged in other device(s) (such as in device 110 if illustrated in supporting device(s) 120 or vice-versa, or in other device(s) altogether) without departing from the disclosure. FIG. 3 illustrates such a configured device 110.

In at least some embodiments, the supporting device(s) 120 may receive the audio data 211 from the device 110, to recognize speech corresponding to a spoken input in the received audio data 211, and to perform functions in response to the recognized speech. In at least some embodiments, these functions involve sending directives (e.g., commands), from the supporting device(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the supporting device(s) 120 over the network(s) 199, some or all of the functions capable of being performed by the supporting device(s) 120 may be performed by sending one or more directives over the network(s) 199 to the device 110, which, in turn, may process the directive(s) and perform one or more corresponding actions. For example, the supporting device(s) 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the supporting device(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIGS. 2 and 3, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the supporting device(s) 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the supporting device(s) 120, and may prevent the ASR component 350 from further processing the audio data 211. In this situation, the audio data 211 can be discarded.

The device 110 may also include a system directed input detector 385. (The supporting device(s) 120 may also include a system directed input detector 285 which may operate in a manner similar to system directed input detector 385.) The system directed input detector 385 may be configured to determine whether an input to the system (for example speech, a gesture, etc.) is directed to the system or not directed to the system (for example directed to another user, etc.). The system directed input detector 385 may work in conjunction with the wakeword detector 220. If the system directed input detector 385 determines an input is directed to the system, the device 110 may "wake" and begin sending captured data for further processing (for example, processing audio data using the language processing 292/392, processing captured image data using image processing component 240/340 or the like). If data is being processed the device 110 may indicate such to the user, for example by activating or changing the color of an illuminated output (such as an LED ring), displaying an indicator on a display (such as a light bar across the display), outputting an audio indicator (such as a beep) or otherwise informing a user that input data is being processed. If the system directed input detector 385 determines an input is not directed to the system (such as a speech or gesture directed to another user) the device 110 may discard the data and take no further action for processing purposes. In this way the system 100 may prevent processing of data not directed to the system, thus protecting the users' privacy. As an indicator to the user, however, the system may output an audio, visual, or other indicator when the system directed input detector 385 is determining whether an input is potentially device directed. For example, the system may output an orange indicator while considering an input, and may output a green indicator if a system directed input is detected. Other such configurations are possible.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the supporting device(s) 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/120 (which may operate similarly to skill components 290), a user recognition component 395 (configured to process in a similar manner to that discussed herein with respect to the user recognition component 295 of the supporting device(s) 120), profile storage 370 (configured to store similar profile data to that discussed herein with respect to the profile storage 270 of the supporting device(s) 120), or other components. In at least some embodiments, the profile storage 370 may only store profile data for a user or group of users specifically associated with the device 110. Similar to as described above with respect to skill component 290, a skill component 390 may communicate with skill device(s) 125. The device 110 may also have its own language output component 393 which may include NLG component 379 and TTS component 380. Language output component 393 may operate similarly to language output component 293, NLG component 379 may operate similarly to NLG component 279 and TTS component 380 may operate similarly to TTS component 280.

In at least some embodiments, the on-device language processing components may not have the same capabilities as the language processing components of the supporting device(s) 120. For example, the on-device language processing components may be configured to handle only a subset of the natural language user inputs that may be handled by the supporting device(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the supporting device(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the supporting device(s) 120.

The hybrid selector 324, of the device 110, may include a hybrid proxy (HP) 326 configured to proxy traffic to/from the supporting device(s) 120. For example, the HP 326 may be configured to send messages to/from a hybrid execution controller (HEC) 327 of the hybrid selector 324. For example, command/directive data received from the supporting device(s) 120 can be sent to the HEC 327 using the HP 326. The HP 326 may also be configured to allow the audio data 211 to pass to the supporting device(s) 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the supporting device(s) 120 and chooses to use that remotely-determined directive data.

Thus, when the audio data 211 is received, the HP 326 may allow the audio data 211 to pass through to the supporting device(s) 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the supporting device(s) 120 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the supporting device(s) 120.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the supporting device(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the supporting device(s) 120, assuming a remote response is even received (e.g., when the device 110 is able to access the supporting device(s) 120 over the network(s) 199), or to determine output audio requesting additional information from the user 5.

The device 110 and/or the supporting device(s) 120 may associate a unique identifier with each natural language user input. The device 110 may include the unique identifier when sending the audio data 211 to the supporting device(s) 120, and the response data from the supporting device(s) 120 may include the unique identifier to identify which natural language user input the response data corresponds.

In at least some embodiments, the device 110 may include, or be configured to use, one or more skill components 390 that may work similarly to the skill component(s) 290 implemented by the supporting device(s) 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill device(s) 125. For example, skill device(s) 125 may be located in a remote environment (e.g., separate location) such that the device 110 may only communicate with the skill device(s) 125 via the network(s) 199. However, the disclosure is not limited thereto. For example, in at least some embodiments, skill device(s) 125 may be configured in a local environment (e.g., home server and/or the like) such that the device 110 may communicate with the skill device(s) 125 via a private network, such as a local area network (LAN).

As used herein, a "skill" may refer to a skill component 390, skill device(s) 125, or a combination of a skill component 390 and corresponding skill device(s) 125. Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 220 may result in sending audio data to certain language processing components 392/skills 390 for processing while detection of the wakeword "Computer" by the wakeword detector may result in sending audio data different language processing components 392/skills 390 for processing.

Figure 4:
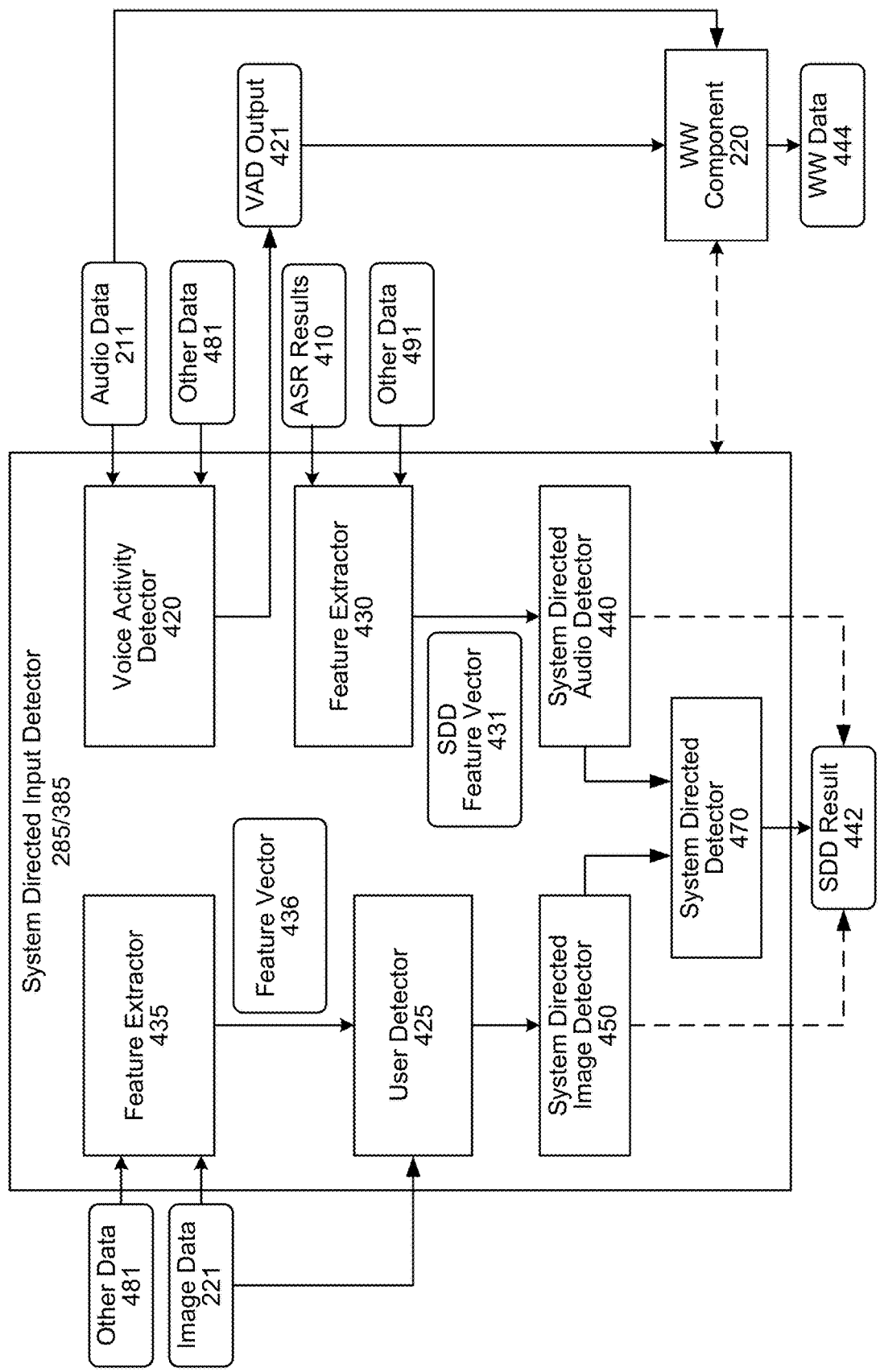
FIG. 4 is a conceptual diagram of components of a system to detect if input audio data includes system directed speech, according to embodiments of the present disclosure.

Configuration and operation of the system directed input detector 285/385 is illustrated in FIG. 4. As shown in FIG. 4, the system directed input detector 285/385 may include a number of different components. First, the system directed input detector 285/385 may include a voice activity detector (VAD) 420. The VAD 420 may operate to detect whether the incoming audio data 211 includes speech or not. The VAD output 421 may be a binary indicator. Thus, if the incoming audio data 211 includes speech, the VAD 420 may output an indicator 421 that the audio data 211 does includes speech (e.g., a 1) and if the incoming audio data 211 does not includes speech, the VAD 420 may output an indicator 421 that the audio data 211 does not includes speech (e.g., a 0). The VAD output 421 may also be a score (e.g., a number between 0 and 1) corresponding to a likelihood that the audio data 211 includes speech. The VAD 420 may also perform start-point detection as well as end-point detection where the VAD 420 determines when speech starts in the audio data 211 and when it ends in the audio data 211. Thus the VAD output 421 may also include indicators of a speech start point and/or a speech endpoint for use by other components of the system. (For example, the start-point and end-points may demarcate the audio data 211 that is sent to the speech processing component 240.) The VAD output 421 may be associated with a same unique ID as the audio data 211 for purposes of tracking system processing across various components.

The VAD 420 may operate using a variety of VAD techniques, including those described above with regard to VAD operations performed by device 110. The VAD may be configured to be robust to background noise so as to accurately detect when audio data actually includes speech or not. The VAD 420 may operate on raw audio data 211 such as that sent by device 110 or may operate on feature vectors or other data representing the audio data 211. For example, the VAD 420 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 420 may also operate on other data 481 that may be useful in detecting voice activity in the audio data 211. For example, the other data 481 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 420 that speech was detected. If not, that may be an indicator to the VAD 420 that speech was not detected. (For example, a representation may be taken of voice data in the first input audio data which may then be compared to the second input audio data to see if the voices match. If they do (or do not) that information may be considered by the VAD 420.) The VAD 420 may also consider other data when determining if speech was detected. The VAD 420 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 420 may also consider data regarding a previous utterance which may indicate whether the further audio data received by the system is likely to include speech. Other VAD techniques may also be used.

If the VAD output 421 indicates that no speech was detected the system (through orchestrator 230 or some other component) may discontinue processing with regard to the audio data 211, thus saving computing resources that might otherwise have been spent on other processes (e.g., ASR for the audio data 211, etc.). If the VAD output 421 indicates that speech was detected, the system may make a determination as to whether the speech was or was not directed to the speech-processing system. Such a determination may be made by the system directed audio detector 440. The system directed audio detector 440 may include a trained model, such as a DNN, that operates on a feature vector which represent certain data that may be useful in determining whether or not speech is directed to the system. To create the feature vector operable by the system directed audio detector 440, a feature extractor 430 may be used. The feature extractor 430 may input ASR results 410 which include results from the processing of the audio data 211 by a speech recognition component.

For privacy protection purposes, in certain configurations the ASR results 410 may be obtained from a language processing component 392/ASR component 350 located on device 110 or on a home remote component as opposed to a language processing component 292/ASR component 250 located on a cloud or other remote supporting device(s) 120 so that audio data 211 is not sent remote from the user's home unless the system directed input detector component 385 has determined that the input is system directed. Though this may be adjusted depending on user preferences/system configuration.

The ASR results 410 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 410 may include a trellis, which may include a raw search graph as scored during ASR decoding. The ASR results 410 may also include a lattice, which may be a trellis as scored that has been pruned to remove certain hypotheses that do not exceed a score threshold or number of hypotheses threshold. The ASR results 410 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 410 may also include corresponding respective scores (such as for a trellis, lattice, confusion network, individual hypothesis, N-best list, etc.)

The ASR results 410 (or other data 491) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 250 being less confident about its best hypothesis, which in turn may correlate to detected speech not being device directed. The entropy may be a feature included in other data 491 to be considered by the system directed audio detector 440.

The system may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 250 is less confident about the top hypothesis, which may correlate to detected speech not being device directed. Other such features or data from the ASR results 410 may also be used as other data 491.

The ASR results 410 may be represented in a system directed detector (SDD) feature vector 431 that can be used to determine whether speech was system-directed. The feature vector 431 may represent the ASR results 410 but may also represent audio data 211 (which may be input to feature extractor 430) or other information. Such ASR results may be helpful in determining if speech was system-directed. For example, if ASR results include a high scoring single hypothesis, that may indicate that the speech represented in the audio data 211 is directed at, and intended for, the device 110. If, however, ASR results do not include a single high scoring hypothesis, but rather many lower scoring hypotheses, that may indicate some confusion on the part of the speech recognition component 250 and may also indicate that the speech represented in the audio data 211 was not directed at, nor intended for, the device 110.

The ASR results 410 may include complete ASR results, for example ASR results corresponding to all speech between a startpoint and endpoint (such as a complete lattice, etc.). In this configuration the system may wait until all ASR processing for a certain input audio has been completed before operating the feature extractor 430 and system directed audio detector 440. Thus the system directed audio detector 440 may receive a feature vector 431 that includes all the representations of the audio data 211 created by the feature extractor 430. The system directed audio detector 440 may then operate a trained model (such as a DNN) on the feature vector 431 to determine a score corresponding to a likelihood that the audio data 211 includes a representation of system-directed speech. If the score is above a threshold, the system directed audio detector 440 may determine that the audio data 211 does include a representation of system-directed speech. The SDD result 442 may include an indicator of whether the audio data includes system-directed speech, a score, and/or some other data.

The ASR results 410 may also include incomplete ASR results, for example ASR results corresponding to only some speech between a between a startpoint and endpoint (such as an incomplete lattice, etc.). In this configuration the feature extractor 430/system directed audio detector 440 may be configured to operate on incomplete ASR results 410 and thus the system directed audio detector 440 may be configured to output an SSD result 442 that provides an indication as to whether the portion of audio data processed (that corresponds to the incomplete ASR results) corresponds to system directed speech. The system may thus be configured to perform ASR at least partially in parallel with the system directed audio detector 440 to process ASR result data as it is ready and thus continually update an SDD result 442. Once the system directed input detector 285/385 has processed enough ASR results and/or the SDD result 442 exceeds a threshold, the system may determine that the audio data 211 includes system-directed speech. Similarly, once the system directed input detector 285/385 has processed enough ASR results and/or the SDD result 442 drops below another threshold, the system may determine that the audio data 211 does not include system-directed speech.

The SDD result 442 may be associated with a same unique ID as the audio data 211 and VAD output 421 for purposes of tracking system processing across various components.

The feature extractor 430 may also incorporate in a feature vector 431 representations of other data 491. Other data 491 may include, for example, word embeddings from words output by the speech recognition component may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 430 processing and representing a word embedding in a feature vector 431 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 491 may also include, for example, NLU output from the natural language 260 component may be considered. Thus, if natural language output data 1585/1525 indicates a high correlation between the audio data 211 and an out-of-domain indication (e.g., no intent classifier scores from ICs or overall domain scores from recognizers reach a certain confidence threshold), this may indicate that the audio data 211 does not include system-directed speech. Other data 491 may also include, for example, an indicator of a user/speaker as output user recognition component 295. Thus, for example, if the user recognition component 295 does not indicate the presence of a known user, or indicates the presence of a user associated with audio data 211 that was not associated with a previous utterance, this may indicate that the audio data 211 does not include system-directed speech. The other data 491 may also include an indication that a voice represented in audio data 211 is the same (or different) as the voice detected in previous input audio data corresponding to a previous utterance. The other data 491 may also include directionality data, for example using beamforming or other audio processing techniques to determine a direction/location of a source of detected speech and whether that source direction/location matches a speaking user. The other data 491 may also include data indicating that a direction of a user's speech is toward a device 110 or away from a device 110, which may indicate whether the speech was system directed or not.

Other data 491 may also include image data 112. For example, if image data is detected from one or more devices that are nearby to the device 110 (which may include the device 110 itself) that captured the audio data being processed using the system directed input detector (285/385), the image data may be processed to determine whether a user is facing an audio capture device for purposes of determining whether speech is system-directed as further explained below.

Other data 491 may also dialog history data. For example, the other data 491 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information. The other data 491 may also include an indicator as to whether the audio data 211 was received as a result of a wake command or whether the audio data 211 was sent without the device 110 detecting a wake command (e.g., the device 110 being instructed by supporting device(s) 120 and/or determining to send the audio data without first detecting a wake command).

Other data 491 may also include information from the user profile 270.

Other data 491 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 491 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 491 may also include an indicator that indicates whether the audio data 211 includes a wakeword. For example, if a device 110 detects a wakeword prior to sending the audio data 211 to the supporting device(s) 120, the device 110 may send along an indicator that the device 110 detected a wakeword in the audio data 211. In another example, the supporting device(s) 120 may include another component that processes incoming audio data 211 to determine if it includes a wakeword. If it does, the component may create an indicator indicating that the audio data 211 includes a wakeword. The indicator may then be included in other data 491 to be incorporated in the feature vector 431 and/or otherwise considered by the system directed audio detector 440.

Other data 491 may also include device history data such as information about previous operations related to the device 110 that sent the audio data 211. For example, the other data 491 may include information about a previous utterance that was just executed, where the utterance originated with the same device 110 as a current utterance and the previous utterance was within a certain time window of the current utterance. Device history data may be stored in a manner associated with the device identifier (which may also be included in other data 491), which may also be used to track other information about the device, such as device hardware, capability, location, etc.

The other data 481 used by the VAD 420 may include similar data and/or different data from the other data 491 used by the feature extractor 430. The other data 481/491 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 440 and/or the VAD 420) may be based on the data from the previous utterance. For example, a score threshold (for the system directed audio detector 440 and/or the VAD 420) may be based on acoustic data from a previous utterance.

The feature extractor 430 may output a single feature vector 431 for one utterance/instance of input audio data 211. The feature vector 431 may consistently be a fixed length, or may be a variable length vector depending on the relevant data available for particular audio data 211. Thus, the system directed audio detector 440 may output a single SDD result 442 per utterance/instance of input audio data 211. The SDD result 442 may be a binary indicator. Thus, if the incoming audio data 211 includes system-directed speech, the system directed audio detector 440 may output an indicator 442 that the audio data 211 does includes system-directed speech (e.g., a 1) and if the incoming audio data 211 does not includes system-directed speech, the system directed audio detector 440 may output an indicator 442 that the audio data 211 does not system-directed includes speech (e.g., a 0). The SDD result 442 may also be a score (e.g., a number between 0 and 1) corresponding to a likelihood that the audio data 211 includes system-directed speech. Although not illustrated in FIG. 4, the flow of data to and from the system directed input detector 285/385 may be managed by the orchestrator 230 or by one or more other components.

The trained model(s) of the system directed audio detector 440 may be trained on many different examples of SDD feature vectors that include both positive and negative training samples (e.g., samples that both represent system-directed speech and non-system directed speech) so that the DNN and/or other trained model of the system directed audio detector 440 may be capable of robustly detecting when speech is system-directed versus when speech is not system-directed.

A further input to the system directed input detector 285/385 may include output data from TTS component 280 to avoid synthesized speech output by the system being confused as system-directed speech spoken by a user. The output from the TTS component 280 may allow the system to ignore synthesized speech in its considerations of whether speech was system directed. The output from the TTS component 280 may also allow the system to determine whether a user captured utterance is responsive to the TTS output, thus improving system operation.

The system directed input detector 285/385 may also use echo return loss enhancement (ERLE) and/or acoustic echo cancellation (AEC) data to avoid processing of audio data generated by the system.

As shown in FIG. 4, the system directed input detector 285/385 may simply use audio data to determine whether an input is system directed (for example, system directed audio detector 440 may output an SDD result 442). This may be true particularly when no image data is available (for example for a device without a camera). If image data 112 is available, however, the system may also be configured to use image data 112 to determine if an input is system directed. The image data 112 may include image data captured by device 110 and/or image data captured by other device(s) in the environment of device 110. The audio data 211, image data 112 and other data 481 may be timestamped or otherwise correlated so that the system directed input detector 285/385 may determine that the data being analyzed all relates to a same time window so as to ensure alignment of data considered with regard to whether a particular input is system directed. For example, the system directed input detector 285/385 may determine system directedness scores for every frame of audio data/every image of a video stream and may align and/or window them to determine a single overall score for a particular input that corresponds to a group of audio frames/images.

Image data 112 along with other data 481 may be received by feature extractor 435. The feature extractor may create one or more feature vectors 436 which may represent the image data 112/other data 481. In certain examples, other data 481 may include data from image processing component 240 which may include information about faces, gesture, etc. detected in the image data 112. For privacy protection purposes, in certain configurations any image processing/results thereof may be obtained from an image processing component 340 located on device 110 or on a home remote component as opposed to a image processing component 240 located on a cloud or other supporting device(s) 120 so that image data 112 is not sent remote from the user's home unless the system directed input detector component 385 has determined that the input is system directed. Though this may be adjusted depending on user preferences/system configuration.

The feature vector 436 may be passed to the user detector 425. The user detector 425 (which may use various components/operations of image processing component 240, user recognition component 295, etc.) may be configured to process image data 112 and/or feature vector 436 to determine information about the user's behavior which in turn may be used to determine if an input is system directed. For example, the user detector 425 may be configured to determine the user's position/behavior with respect to device 110/system 100. The user detector 425 may also be configured to determine whether a user's mouth is opening/closing in a manner that suggests the user is speaking. The user detector 425 may also be configured to determine whether a user is nodding or shaking his/her head. The user detector 425 may also be configured to determine whether a user's gaze is directed to the device 110, to another user, or to another object. For example, the use detector 425 may include, or be configured to use data from, a gaze detector. The user detector 425 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 425 may also be configured to determine a user's position/orientation such as facing another user, facing the device 110, whether their back is turned, etc. The user detector 425 may also be configured to determine relative positions of multiple users that appear in image data (and/or are speaking in audio data 211 which may also be considered by the user detector 425 along with feature vector 431), for example which users are closer to a device 110 and which are farther away. The user detector 425 (and/or other component) may also be configured to identify other objects represented in image data and determine whether objects are relevant to a dialog or system interaction (for example determining if a user is referring to an object through a movement or speech).

The user detector 425 may operate one or more models (e.g., one or more classifiers) to determine if certain situations are represented in the image data 112. For example the user detector 425 may employ a visual directedness classifier that may determine, for each face detected in the image data 112 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector 425 (or other component(s) such as those in image processing 240) may be configured to track a face in image data to determine which faces represented may belong to a same person. The system may user IOU based tracker, a mean-shift based tracker, a particle filter based tracker or other technique.

The user detector 425 (or other component(s) such as those in user recognition component 295) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 450 may then determine, based on information from the user detector 425, such as the image data 112, whether an input relating to the image data 112 is system directed. The system directed image detector 450 may also operate on other input data, for example image data including raw image data 112, image data including feature vector data 436 based on raw image data, other data 481, or other data. The determination by the system directed image detector 450 may result in a score indicating whether the input is system directed based on the image data. If no audio data is available, the indication may be output as SDD result 442. If audio data is available, the indication may be sent to system directed detector 470 which may consider information from both system directed audio detector 440 and system directed image detector 450. The system directed detector 470 may then process the data from both system directed audio detector 440 and system directed image detector 450 to come up with an overall determination as to whether an input was system directed, which may be output as SDD result 442. The system directed detector 470 may consider not only data output from system directed audio detector 440 and system directed image detector 450 but also other data/metadata corresponding to the input (for example, image data/feature data 436, audio data/feature data 431, image data 112, audio data 211, or the like discussed with regard to FIG. 4. The system directed detector 470 may include one or more models which may analyze the various input data to make a determination regarding SDD result 442.

In one example the determination of the system directed detector 470 may be based on "AND" logic, for example determining an input is system directed only if affirmative data is received from both system directed audio detector 440 and system directed image detector 450. In another example the determination of the system directed detector 470 may be based on "OR" logic, for example determining an input is system directed if affirmative data is received from either system directed audio detector 440 or system directed image detector 450. In another example the data received from system directed audio detector 440 and system directed image detector 450 are weighted individually based on other information available to system directed detector 470 to determine to what extend audio and/or image data should impact the decision of whether an input is system directed.

The system directed input detector 285/385 may also receive information from a wakeword component 220. For example, an indication that a wakeword was detected (e.g., WW data 444) may be considered by the system directed input detector 285/385 (e.g., by system directed audio detector 440, system directed detector 470, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 292). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 211 or image data 112) sent to supporting device(s) 120 that are outside a user's home or other direct control.

Figure 5:
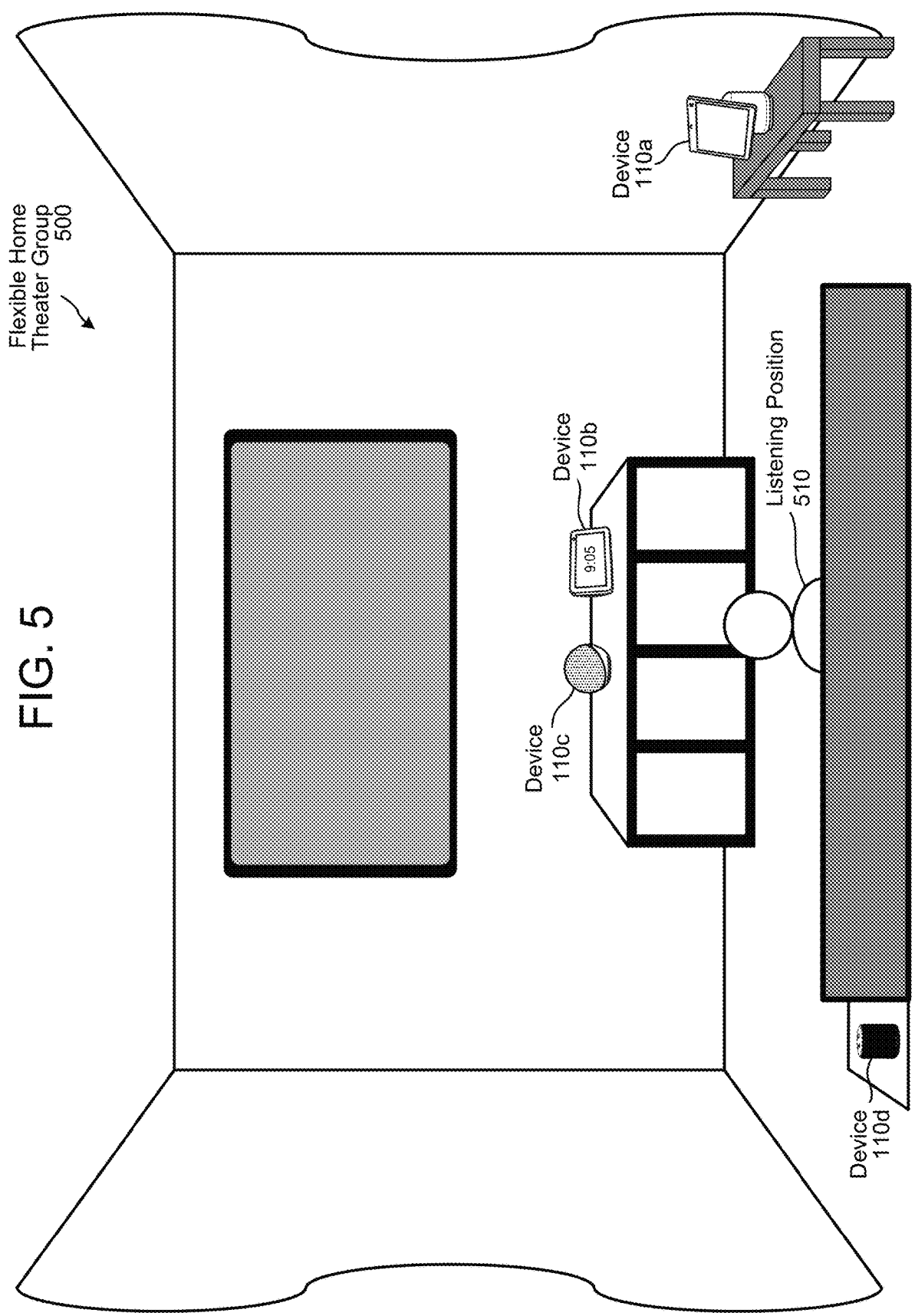
FIG. 5 illustrates an example of a flexible home theater according to embodiments of the present disclosure.

FIG. 5 illustrates an example of a flexible home theater according to embodiments of the present disclosure. As illustrated in FIG. 5, a flexible home theater group 500 may comprise a variety of devices 110 without departing from the disclosure. For example, FIG. 5 illustrates an example home theater that includes a first device 110*a* (e.g., device with a screen) at a first location to the right of a listening position 510 of the user, a second device 110*b* (e.g., device with a screen) at a second location below the television to the right of the listening position 510, a third device 110*c* (e.g., device configured with an audio user interface) at a third location below the television to the left of the listening position 510, and a fourth device 110*d* (e.g., device configured with an audio user interface) at a fourth location to the left of the listening position 510. However, the disclosure is not limited thereto and the flexible home theater group 500 may include additional devices 110 without departing from the disclosure. For example, the flexible home theater group 500 may include another device 110 (e.g., television or headless device associated with the television) without departing from the disclosure. Additionally or alternatively, the flexible home theater group 500 may include fewer devices 110 and/or the locations of the devices 110 may vary without departing from the disclosure.

Despite the flexible home theater group 500 including multiple different types of devices 110 in an asymmetrical configuration relative to the listening position 510 of the user, in some examples the system 100 may generate playback audio optimized for the listening position 510. For example, the system 100 may generate map data indicating the locations of the devices 110, the type of devices 110, and/or other context (e.g., number of loudspeakers, frequency response of the drivers, etc.), and may send the map data to a rendering component. The rendering component may generate individual renderer coefficient values for each of the devices 110, enabling each individual device 110 to generate playback audio that takes into account the location of the device 110 and characteristics of the device 110 (e.g., frequency response, etc.).

To illustrate a first example, the second device 110*b* may act as a left channel and the third device 110*c* may act as a right channel in the flexible home theater group 500, despite not being positioned symmetrically relative to the television. For example, first renderer coefficient values associated with the second device 110*b* may adjust first playback audio generated by the second device 110*b* to shift the sound stage a first distance to the right from the perspective of the listening position 510, while second renderer coefficient values associated with the third device 110*c* may adjust second playback audio generated by the third device 110*c* to shift the sound stage a second distance to the left from the perspective of the listening position 510. Thus, the second renderer coefficient values may compensate for the asymmetric placement of the third device 110*c*. To illustrate a second example, the fourth device 110*d* may act as a left surround channel and the first device 110*a* may act as a right surround channel in the flexible home theater group 500, despite being different distances from the listening position 510. For example, third renderer coefficient values associated with the fourth device 110*d* may adjust third playback audio generated by the fourth device 110*d*, while fourth renderer coefficient values associated with the first device 110*a* may adjust fourth playback audio generated by the first device 110*a* such that the two channels are balanced from the perspective of the listening position 510.

In order to generate the rendering coefficient values, the system 100 may perform device localization to generate a device map indicating relative positions of the devices 110*a*-110*d*. In some examples, the system 100 may cause each device 110 included in the flexible home theater group 500 to generate audible sounds representing a calibration tone during a calibration sequence. For example, a first device (e.g., Device1) may generate a first audible sound during a first time range, a second device (e.g., Device2) may generate a second audible sound during a second time range, and so on, according to the calibration sequence.

During the calibration sequence, the first device 110*a* may generate first audio data capturing one or more audible sounds and may perform angle of arrival estimation processing to determine direction(s) associated with the audible sound(s) represented in the first audio data. For example, if the second device 110*b* is generating the second audible sound during the second time range, the first device 110*a* may capture a representation of the second audible sound and perform angle of arrival estimation processing to determine that the second device 110*b* is in a first direction relative to the first device 110*a*, although the disclosure is not limited thereto. As described above, the first device 110*a* may indicate the first direction as a first estimated angle of arrival, a first azimuth value, and/or the like without departing from the disclosure. Similarly, if the third device 110*c* is generating the third audible sound during a third time range, the first device 110*a* may capture a representation of the third audible sound and perform angle of arrival estimation processing to determine that the third device 110*c* is in a second direction relative to the first device 110*a*, although the disclosure is not limited thereto.

While FIG. 5 illustrates the first device 110*a* as being included in the flexible home theater group 500, the disclosure is not limited thereto. In some examples, the first device 110*a* may perform angle of arrival estimation processing for a second device 110*b* regardless of a configuration, location, relative placement, and/or the like associated with the second device 110*b*. Additionally or alternatively, while the example described above refers to the first device 110*a* generating the first audio data as part of a calibration sequence, the disclosure is not limited thereto. For example, the first device 110*a* may generate the first audio data and determine the estimated angle of arrival for the second device 110b without participating in a calibration sequence and/or without the first device 110a generating the calibration tone without departing from the disclosure. Thus, the first device 110a may determine the estimated angle of arrival for any device 110 in proximity to the first device 110a, without either device 110 being part of the flexible home theater group 500, without departing from the disclosure.

Figure 6:
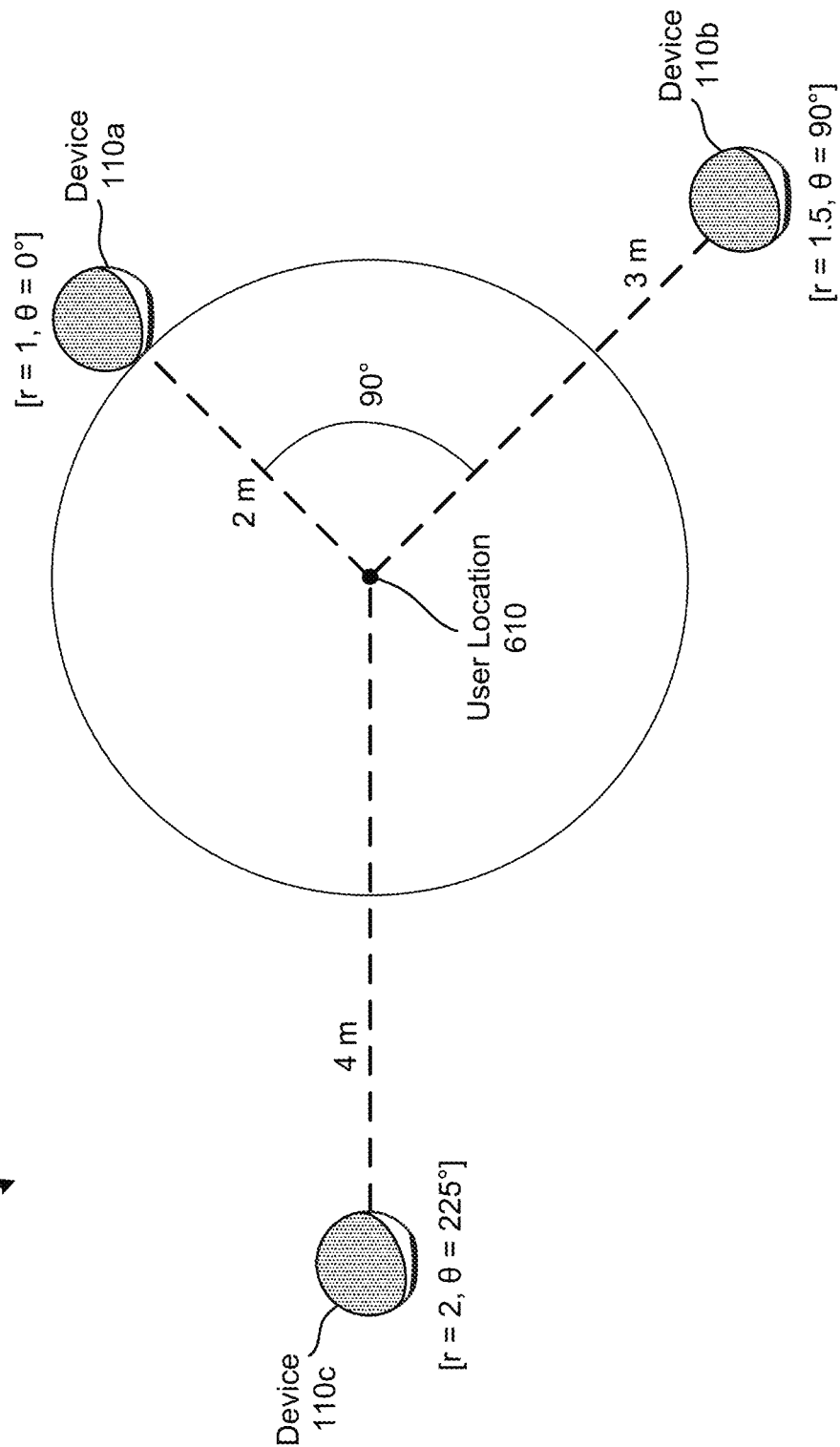
FIG. 6 illustrates an example of generating spatial information according to embodiments of the present disclosure.

FIG. 6 illustrates an example of generating spatial information according to embodiments of the present disclosure. As described above, the system 100 may perform device localization to generate a device map indicating relative positions of multiple devices 110. For example, the system 100 may generate map data indicating the locations of the devices 110, the type of devices 110, and/or other context (e.g., number of loudspeakers, frequency response of the drivers, etc.). To perform user orientation estimation, the system 100 may convert the map data into spatial information that can be input to a trained model along with the audio data and/or audio features. For example, the spatial information may provide the trained model with an overview of the device map relative to the user location, with relative distances and/or relative angles for each device 110 that is used to perform user orientation estimation.

In the example illustrated in FIG. 6, the system 100 may determine map data associated with a group of three devices 110a-110c. For example, the system 100 may perform device localization to determine relative positions of the devices 110a-110c, may perform user localization to determine a user location 610, and then may generate the map data centered on the user location 610. Thus, the map data may represent the user location 610 at an origin (e.g., [0,0]), the first device 110a at a first position, the second device 110b at a second position, and the third device 110c at a third position. The system 100 may represent the first position using first polar coordinates, such as a first distance value (e.g., 2 m) relative to the user location 610 and a first azimuth value (e.g., −45°) relative to the positive horizontal axis, first rectangular coordinates (e.g., [1.41, 1.41]), and/or the like without departing from the disclosure. Similarly, the system 100 may represent the second position using second polar coordinates, such as a second distance value (e.g., 3 m) and a second azimuth value (45°), and/or second rectangular coordinates (e.g., [2.12, 2.12]), and may represent the third position using third polar coordinates, such as a third distance value (e.g., 4 m) and a third azimuth value (e.g., 180°), and/or third rectangular coordinates (e.g., [−4, 0]), although the disclosure is not limited thereto.

In order to convey the relative positions of the devices 110a-110c to the trained model, the system 100 may convert the map data into spatial information. In some examples, the system 100 may determine which of the three devices 110a-110c is closest to the user location 610 and may generate the spatial information using the closest device as a reference point. For example, the system 100 may determine that the first device 110a is closest to the user location 610 and may select the first position as a reference point with which to generate the spatial information. Thus, the system 100 may normalize the distance to each device 110 based on the first distance (e.g., 2 m) and may measure azimuth values relative to the first azimuth value (e.g., −45°).

In the spatial information examples 600 illustrated in FIG. 6, the system 100 may generate first spatial information associated with the first device 110a, second spatial information associated with the second device 110b, and third spatial information associated with the third device 110c. For example, the first spatial information may associate the first device 110a with a first location [r=1, θ=0°], indicating that the first device 110a is the closest to the user location 610 and therefore used as a reference point. The system 100 may encode the second spatial information with respect to the first device 110a, such that the second spatial information associates the second device 110b with a second location [r=1.5, θ=90°] based on the second distance being 1.5× the first location (e.g., 3 m/2 m=1.5) and the second azimuth value being 90° relative to the first azimuth value (e.g., 45°−−45°=90°). Similarly, the system 100 may encode the third spatial information with respect to the first device 110a, such that the third spatial information associates the second device 110b with a third location [r=2, θ=225°] based on the third distance being 2× the first location (e.g., 4 m/2 m=2) and the third azimuth value being 225° relative to the first azimuth value (e.g., 180°−−45°=225°).

As used herein, the first spatial information, the second spatial information, and the third information may collectively be referred to as spatial information data and/or spatial information without departing from the disclosure. For example, a first portion of spatial information may indicate the first location associated with the first device 110a, a second portion of the spatial information may indicate the second location associated with the second device 110b, and a third portion of the spatial information may indicate the third location associated with the third device 110c, although the disclosure is not limited thereto.

FIG. 7 illustrates examples of frequency content associated with a front-facing device and a back-facing device according to embodiments of the present disclosure. As described above with regard to FIG. 1, the system 100 may estimate a user orientation based on high frequency components of speech signals. For example, when a user generates speech, lower frequency components of the speech (e.g., 250 Hz) typically exhibit an omnidirectional pattern (e.g., radiation pattern is omnidirectional), while higher frequency components of the speech (e.g., 3 kHz or higher) exhibit a directional pattern (e.g., radiation pattern takes a directional shape). This directional pattern results in the higher frequency components of the speech having greater amplitude values in the direction that the user is facing (e.g., emitted direction) relative to other directions.

In order to estimate the user orientation for a particular user, the system 100 may capture a speech signal generated by the user using multiple devices 110 and may compare radiation patterns of the speech signal between the multiple devices 110. For example, an individual device 110 may generate audio data representing the speech signal and may extract a plurality of features (e.g., audio features) from the audio data to generate feature data (e.g., feature vector data). In some examples, the device 110 may convert the audio data from a time domain to a frequency domain, such as by performing Fast-Fourier Transform (FFT) processing and/or the like. For example, the device 110 may generate first audio data in the time domain and perform FFT processing to generate second audio data in the frequency domain, although the disclosure is not limited thereto.

In this example, the device 110 may generate feature data that represents frequency content (e.g., spectral characteristics) of an individual segment of the second audio data. For example, the device 110 may generate at least a portion of the plurality of features by determining magnitude values associated with individual frequency bands of the second audio data. Thus, the device 110 may determine a first magnitude value associated with a first frequency band, a second magnitude value associated with a second frequency band, and so on for a plurality of frequency bands.

In some examples, the plurality of frequency bands may have a uniform size, such that each frequency band corresponds to a fixed range of frequency values (e.g., 62.5 kHz, 125 kHz, and/or the like). The disclosure is not limited thereto, however, and in other examples the plurality of frequency bands may have varying sizes, such that lower frequency bands include a smaller range of frequency values while higher frequency bands include a larger range of frequency values. Thus, the system 100 may generate the feature data by determining Discrete Cosine Transform (DCT) feature data, Log-Filter Bank Energies (LFBE) feature data (e.g., log-mel filter bank energy feature data), and/or other feature data without departing from the disclosure.

The feature data may be visualized using a time-frequency graph, such as a spectrogram, which is a visual representation of frequency content included in a portion of the second audio data. To illustrate an example, the system 100 may divide the second audio data into segments over time and plot the results in a graph that represents the audio using three dimensions: frequency, amplitude, and time. For example, a spectrogram may represent frequency (e.g., frequency ranges or subbands) along a vertical axis, time (e.g., audio frames) along a horizontal axis, and amplitude (e.g., intensity values) as a color ranging from white (e.g., low intensity value) to black (e.g., high intensity value). Thus, an audio signal may be represented as individual audio frames (e.g., feature vectors corresponding to a time window). For example, a feature vector may be a vertical representation of an individual audio frame that may include a number of harmonics (e.g., horizontal lines in the spectrogram). A particular row in a sequence of feature vectors (e.g., element k in each feature vector) may be associated with the same frequency/pitch/harmonic of the audio signal at different points in time.

Examples of feature data are illustrated in FIG. 7. For example, a front-facing device example 710 includes a first spectrogram 715 illustrating examples of first feature data associated with a front-facing device 110 (e.g., device 110 positioned in front of the user), while a back-facing device example 720 includes a second spectrogram 725 illustrating examples of second feature data associated with a back-facing device 110 (e.g., device 110 positioned behind the user).

As illustrated in FIG. 7, a horizontal axis of the spectrogram 715/725 corresponds to time and a vertical axis of the spectrogram 715/725 corresponds to frequency, dividing the spectrogram 715/725 into a plurality of time-frequency units. In addition, the spectrogram 715/725 represents an amplitude (e.g., magnitude value) associated with an individual time-frequency unit as an intensity value having a color ranging from white (e.g., low intensity value) to black (e.g., high intensity value). Thus, the first spectrogram 715 illustrates a first representation of the speech signal captured by the front-facing device 110, which exhibits a first radiation pattern, while the second spectrogram 725 illustrates a second representation of the speech signal captured by the back-facing device 110, which exhibits a second radiation pattern.

As illustrated in FIG. 7, the system 100 may distinguish between a front-facing device 110 (e.g., front-facing device example 710) and a back-facing device 110 (e.g., back-facing device example 720) based on an amount of high-frequency content represented in the feature data. For example, the first spectrogram 715 includes more high-frequency content than the second spectrogram 725, which exhibits a lack of high-frequency content in comparison.

In some examples, the system 100 may compare the first radiation pattern to the second radiation pattern and determine that the user is more likely to be facing a first device associated with the first radiation pattern than a second device associated with the second radiation pattern. Additionally or alternatively, the system 100 may estimate a user orientation using the first radiation pattern and the second radiation pattern. For example, the system 100 may determine a user orientation estimate indicating that the user is facing a direction closer to the first device than the second device without departing from the disclosure. However, the disclosure is not limited thereto and the system 100 may need additional feature data captured by one or more additional devices 110 in order to improve an accuracy of the user orientation estimate.

In some examples, the system 100 may perform user orientation estimation using one or more trained models. For example, multiple devices 110 may generate feature data and share the feature data with each other, enabling an individual device 110 to process the feature data using a trained model to generate orientation data. To improve an accuracy of the user orientation estimate, several devices 110 may include an individual trained model and may generate individual orientation data, enabling the system 100 to perform post-processing to generate final orientation data.

FIG. 8 is a conceptual diagram of components of a system to perform user orientation estimation according to embodiments of the present disclosure. While the system 100 may perform user orientation estimation using any number of devices 110 without departing from the disclosure, FIG. 8 illustrates an orientation estimation example 800 in which user orientation estimation is performed using three devices 110a-110c.

As illustrated in FIG. 8, each of the devices 110a-110c may be configured to generate feature data 835 and send the feature data 835 to the other two devices 110. For example, the first device 110a may generate first feature data 835a and send the first feature data 835a to the second device 110b and the third device 110c, the second device 110b may generate second feature data 835b and send the second feature data 835b to the first device 110a and the third device 110c, and the third device 110c may generate third feature data 835c and send the third feature data 835c to the first device 110a and the second device 110b. Thus, the first device 110a may process the feature data 835a-835c to generate first orientation data 842a, the second device 110b may process the feature data 835a-835c to generate second orientation data 842b, and the third device 110c may process the feature data 835a-835c to generate third orientation data 842c.

Using the orientation data 842a-842c generated by the devices 110a-110c, the system 100 may perform post-processing to generate orientation data 855 that represents a final user orientation estimate (e.g., global user orientation estimate). For example, the system 100 may use two or more individual user orientation estimates included in the orientation data 842a-842c to generate the final user orientation estimate, as will be described in greater detail below.

As illustrated in FIG. 8, the system 100 may include post-processing component(s) 850 configured to generate the orientation data 855. In some examples, the post-processing components 850 may be included as part of one of the three devices 110a-110c. For example, the first device 110a may send the first orientation data 842a to the second device 110b and the third device 110c may send the third orientation data 842 to the second device 110b, enabling the second device 110b to perform the post-processing to generate the orientation data 855. However, the disclosure is not limited thereto, and in other examples the post-processing components 850 may be included in a separate device, such as a fourth device 110d (not shown), a supporting device 120, and/or the like without departing from the disclosure.

The first device 110a may capture a first representation of a speech signal by generating first audio data 810a using three or more microphones associated with the first device 110a. For example, the three or more microphones may be included in a first microphone array of the first device 110a, although the disclosure is not limited thereto. In some examples, the first microphone array may include four microphones, although the disclosure is not limited thereto and the first microphone array may include any number of microphones without departing from the disclosure. For example, the number of microphones may vary depending on a model of the first device 110a (e.g., device type), ranging from only three microphones to eight or more microphones.

To generate the first feature data 835a, the first device 110a may process the first audio data 810a using a first feature extractor component 820a. In some examples, the first device 110a may convert the first audio data 810a from a time domain to a frequency domain, as described in greater detail above with regard to FIG. 7. Thus, the first device 110a may perform FFT processing, STFT processing, and/or the like to generate first frequency audio data in the frequency domain. To illustrate an example, the first device 110a may pass the first audio data 810a through a high-pass filter with a first cutoff frequency (e.g., 500 Hz) and may perform STFT processing using a first window length (e.g., 20 ms) and a first overlap value (e.g., 50%) to generate the first frequency audio data, although the disclosure is not limited thereto.

The first feature extractor component 820a may extract a first plurality of features from the first audio data 810a. In some examples, the first feature extractor component 820a may extract a first subset of the first plurality of features using the first frequency audio data without departing from the disclosure. For example, the first subset may correspond to magnitude values of the first frequency audio data (e.g., magnitude of the STFT processing). In this example, the first subset of the first plurality of features may be represented as a first vector having a first shape, such as (100, 257, m), where m denotes the number of microphones, although the disclosure is not limited thereto. As the first audio data 810a includes a first representation of the speech signal, the first subset may include features corresponding to the first representation.

In addition, the first feature extractor component 820a may extract a second subset of the first plurality of features using the first audio data 810a. For example, the first feature extractor component 820a may generate the second subset of the first plurality of features by determining generalized cross-correlation values representing phase information of the first audio data 810a. This phase information may be a useful feature for the trained model, as the phase information may vary depending on whether the user is facing the first device 110a.

To illustrate an example, if the user is directly facing the first device 110a, a beginning of the speech signal (e.g., first few milliseconds) may have less distortion as a first portion of the first audio data 810a corresponds to a direct-path component without capturing acoustic reflections. Thus, first generalized cross-correlation values associated with the first portion of the first audio data 810a may be different than second generalized cross-correlation values associated with other portions of the first audio data 810a in which the acoustic reflections are present.

To calculate the generalized cross-correlation values, in some examples the first feature extractor component 820a may perform Generalized Cross Correlation with Phase Transform (GCC-PHAT) processing using multiple microphones included in the microphone array. Given two signals $x_i(n)$ and $x_j(n)$, the GCC-PHAT value is defined as:

$$\hat{G}_{PHAT}(f) = \frac{X_i(f)[X_j(f)]^*}{|X_i(f)[X_j(f)]^*|} \quad [1]$$

where $X_i(f)$ and $X_j(f)$ are the Fourier transforms of the two signals and [ ] * denotes the complex conjugate. In some examples, the GCC-PHAT processing may use a first number of frequency bins (e.g., 64 bins) and the second subset of the first plurality of features may be represented as a second vector having a second shape, such as (100, 64, p), where p denotes a number of microphone pairs, although the disclosure is not limited thereto. For example, if the microphone array includes four microphones, the first device 110a may perform the GCC-PHAT processing on up to six microphone pairs.

As described above with regard to FIG. 6, the first device 110a may determine first spatial information 815a corresponding to a position of the first device 110a relative to the reference point (e.g., closest device 110). For example, the first spatial information 815a may include two values, a distance value indicating a ratio of the first distance associated with the first device 110a to a minimum distance associated with the reference point, and an azimuth value indicating a direction of the first device 110a relative to the reference point. As the first device 110a is the closest device 110a, the system 100 may use the first location of the first device 110a as the reference point, such that the first spatial information 815a corresponds to the reference values (e.g., [r=1, θ=0°]).

As illustrated in FIG. 8, a first feature encoding component 830a may receive the first plurality of features from the first feature extractor component 820a, along with the first spatial information 815a, and may perform feature encoding to generate the first feature data 835a. For example, for each individual sample within a batch of samples, the first feature encoding component 830a may generate a portion of the first feature data 835a using the first subset of the first plurality of features, the second subset of the first plurality of features, and the first spatial information 815a. In some examples, a portion of the first feature data 835a corresponding to a single sample may include the first subset represented as the first vector having the first shape (100, 257, m), where m denotes the number of microphones, the second subset represented as the second vector having the second shape (100, 64, p), where p denotes a number of microphone pairs and the second value indicates a number of frequency bins (e.g., 64 frequency bins), and the first spatial information 815a represented as a third vector having a third shape (2).

While the example described above refers to generating a single portion of the first feature data 835a corresponding to an individual sample, the first feature encoding component 830a may generate the first feature data 835a using a plurality of samples (e.g., batch of samples). To illustrate an example using a first batch size (e.g., 64 samples in a batch), the first feature encoding component 830a may generate a first batch of the first feature data 835a using first samples (e.g., 64 samples) associated with the first device 110a.

Thus, the first batch of the first feature data 835a may include the first subset for each of the first samples, which may be represented as a fourth vector having a fourth shape (64, 1, 100, 257, m), the second subset for each of the first samples, which may be represented as a fifth vector having a fifth shape (64, 1, 100, 64, p), and the first spatial information 815a for each of the first samples, which may be represented as a sixth vector having a sixth shape (64, 1, 2).

To generate the second feature data 835b, the second device 110b may perform similar steps as those described above with regard to the first device 110a. For example, the second device 110b may capture a second representation of the speech signal by generating second audio data 810b using a second microphone array. In addition, the second device 110b may process the second audio data 810b in the time domain to generate second frequency audio data in the frequency domain. As illustrated in FIG. 8, the second device 110b may also include similar components to the components described above with regard to the first device 110a. For example, the second device 110b may include a second feature extractor component 820b and a second feature encoding component 830b without departing from the disclosure.

The second feature extractor component 820b may process the second audio data 810b and/or the second frequency audio data to generate a second plurality of features. In some examples, the second feature extractor component 820b may use the second frequency audio data to generate a first subset of the second plurality of features, as described in greater detail above. For example, the first subset may correspond to magnitude values of the second frequency audio data and may be represented as a vector having the first shape (100, 257, m). As the second audio data 810b includes the second representation of the speech signal, the first subset may include features corresponding to the second representation.

In addition, the second feature extractor component 820b may use the second audio data 810b to extract a second subset of the second plurality of features, as described in greater detail above. For example, the second feature extractor component 820b may generate the second subset of the second plurality of features by determining generalized cross-correlation values representing phase information of the second audio data 810b. As described above, this phase information may be a useful feature for the trained model, as the phase information may vary depending on whether the user is facing the second device 110b. In some examples, the second subset of the second plurality of features may be represented as a vector having the second shape (100, 64, p), where p denotes a number of microphone pairs, although the disclosure is not limited thereto.

As described above with regard to FIG. 6, the second device 110b may determine second spatial information 815b corresponding to a position of the second device 110b relative to the reference point (e.g., first device 110a). For example, the second spatial information 815b may include two values, a distance value indicating a ratio of the second distance associated with the second device 110b to the minimum distance associated with the reference point, and an azimuth value indicating a direction of the second device 110b relative to the reference point. As the first device 110a is used as the reference point, the system 100 may determine a first ratio of the second distance to the first distance (e.g., 3 m/2 m=1.5) and a first difference between the second azimuth value and the first azimuth value (e.g., 45°-- 45°=90°). Thus, the second spatial information 815b may be represented as [r=1.5, θ=90°].

As illustrated in FIG. 8, a second feature encoding component 830b may receive the second plurality of features from the second feature extractor component 820b, along with the second spatial information 815b, and may perform feature encoding to generate the second feature data 835b. Using the techniques described above with regard to the first feature encoding component 830a, the second feature encoding component 830b may generate a first batch of the second feature data 835b using second samples (e.g., 64 samples) associated with the second device 110b. Thus, the first batch of the second feature data 835b may include the first subset for each of the second samples, which may be represented as a vector having the fourth shape (64, 1, 100, 257, m), the second subset for each of the second samples, which may be represented as a vector having the fifth shape (64, 1, 100, 64, p), and the second spatial information 815b for each of the second samples, which may be represented as a vector having the sixth shape (64, 1, 2).

To generate the third feature data 835c, the third device 110c may perform similar steps as those described above with regard to the first device 110a. For example, the third device 110c may capture a third representation of the speech signal by generating third audio data 810c using a third microphone array. In addition, the third device 110c may process the third audio data 810c in the time domain to generate third frequency audio data in the frequency domain. As illustrated in FIG. 8, the third device 110c may also include similar components to the components described above with regard to the first device 110a. For example, the third device 110c may include a third feature extractor component 820c and a third feature encoding component 830c without departing from the disclosure.

The third feature extractor component 820c may process the third audio data 810c and/or the third frequency audio data to generate a third plurality of features. In some examples, the third feature extractor component 820c may use the third frequency audio data to generate a first subset of the third plurality of features, as described in greater detail above. For example, the first subset may correspond to magnitude values of the third frequency audio data and may be represented as a vector having the first shape (100, 257, m). As the third audio data 810c includes the third representation of the speech signal, the first subset may include features corresponding to the third representation.

In addition, the third feature extractor component 820c may use the third audio data 810c to extract a second subset of the third plurality of features, as described in greater detail above. For example, the third feature extractor component 820c may generate the second subset of the third plurality of features by determining generalized cross-correlation values representing phase information of the third audio data 810c. As described above, this phase information may be a useful feature for the trained model, as the phase information may vary depending on whether the user is facing the third device 110c. In some examples, the second subset of the third plurality of features may be represented as a vector having the second shape (100, 64, p), where p denotes a number of microphone pairs, although the disclosure is not limited thereto.

As described above with regard to FIG. 6, the third device 110c may determine third spatial information 815c corresponding to a position of the third device 110c relative to the reference point (e.g., first device 110a). For example, the third spatial information 815c may include two values, a distance value indicating a ratio of the third distance associated with the third device 110c to the minimum distance associated with the reference point, and an azimuth value indicating a direction of the third device 110c relative to the reference point. As the first device 110a is used as the reference point, the system 100 may determine a second ratio of the third distance to the first distance (e.g., 4 m/2 m=2) and a second difference between the third azimuth value and the first azimuth value (e.g., 180°−−45°=225°). Thus, the third spatial information 815c may be represented as [r=2, θ=225°].

As illustrated in FIG. 8, a third feature encoding component 830c may receive the third plurality of features from the third feature extractor component 820c, along with the third spatial information 815c, and may perform feature encoding to generate the third feature data 835c. Using the techniques described above with regard to the first feature encoding component 830a, the third feature encoding component 830c may generate a first batch of the third feature data 835c using third samples (e.g., 64 samples) associated with the third device 110c. Thus, the first batch of the third feature data 835c may include the first subset for each of the third samples, which may be represented as a vector having the fourth shape (64, 1, 100, 257, m), the second subset for each of the third samples, which may be represented as a vector having the fifth shape (64, 1, 100, 64, p), and the third spatial information 815c for each of the third samples, which may be represented as a vector having the sixth shape (64, 1, 2).

As illustrated in FIG. 8, each of the devices 110a-110c may include an individual classifier component 840a-840c configured to process the feature data 835a-835c. For example, the first device 110a may include a first classifier component 840a configured to generate first orientation data 842a and first sound source localization (SSL) data 844a, the second device 110b may include a second classifier component 840b configured to generate second orientation data 842b and second SSL data 844b, and the third device 110c may include a third classifier component 840c configured to generate third orientation data 842c and third SSL data 844c.

As illustrated in the orientation estimation example 800, each of the devices 110a-110c may send corresponding feature data 835a-835c to the other devices 110a-110c. For example, the first feature encoding component 830a may send the first feature data 835a to the first classifier component 840a, the second classifier component 840b, and the third classifier component 840c. In addition, the second feature encoding component 830b may send the second feature data 835a to the first classifier component 840a, the second classifier component 840b, and the third classifier component 840c. Finally, the third feature encoding component 830c may send the third feature data 835c to the first classifier component 840a, the second classifier component 840b, and the third classifier component 840c.

As the classifier components 840 process the feature data 835a-835c associated with all three devices, the combined feature data 835 includes three times the number of features generated by the individual feature encoding components 830a-830c. Thus, the combined feature data 835 may include the first subset represented as a vector having a seventh shape (64, 3, 100, 257, m), the second subset represented as a vector having an eighth shape (64, 3, 100, 64, p), and combined spatial information 815 represented as a vector having a ninth shape (64, 3, 2).

In the examples described above, each of the three devices 110a-110c may generate a sample at roughly the same time, which may be referred to as a capture. Thus, the three devices 110a-110c may each generate a first sample associated with a first capture during a first time window (e.g., samples 1-3), a second sample associated with a second capture during a second time window (e.g., samples 4-6), and so on until the three devices 110a-110c each generate the first number of samples corresponding to the batch size (e.g., 64 samples each, for a total of 192 total samples).

In some examples, the device 110 selected as a reference position (e.g., device 110 closest to the user location, such as the first device 110a in the example illustrated in FIG. 6) may generate a first sample for each capture, such that the closest device is provided as the first input across the device dimension. As the first device 110a is associated with the reference position (e.g., r=1, θ=0°) by which the other devices are measured, putting the first device 110a first across the device dimension provides the classifier component 840 with context for the spatial information.

While the example described above refers to the system 100 using the first batch size (e.g., 64 samples) and including three devices 110a-110c in a single capture, the disclosure is not limited thereto and the batch size and/or the number of devices may vary without departing from the disclosure. For example, varying the batch size may vary a number of captures (e.g., individual samples for each device) included in a batch, while varying the number of devices may vary the number of samples included within each capture. Thus, the first two values (e.g., (64, 3)) depend on a configuration of the system 100, just like the number of microphones m and the number of pairs of microphones p.

As will be described in greater detail below with regard to FIG. 10, the combined feature data 835 input to the classifier components 840a-840c may include a first input signal having the seventh shape (64, 3, 100, 257, m), which corresponds to the STFT data, a second input signal having the eighth shape (64, 3, 100, 64, p), which corresponds to the GCC-PHAT values, and a third input signal having the ninth shape (64, 3, 2) which corresponds to the spatial information 815, although the disclosure is not limited thereto.

The first classifier component 840a may be a trained model, such as a deep neural network (DNN), although the disclosure is not limited thereto. As described above, the first classifier component 840a may process the combined feature data 835 to generate first orientation data 842a and first SSL data 844a associated with the first device 110a. For example, the first user orientation data 842a may correspond to a first angle that indicates a direction of the first device 110a with respect to the user's facing direction as estimated by the first device 110a (e.g., first user orientation estimate). In contrast, the first SSL data 844a may correspond to a second angle that indicates a direction of the user with respect to a first device orientation axis of the first device 110a.

Figure 9A:
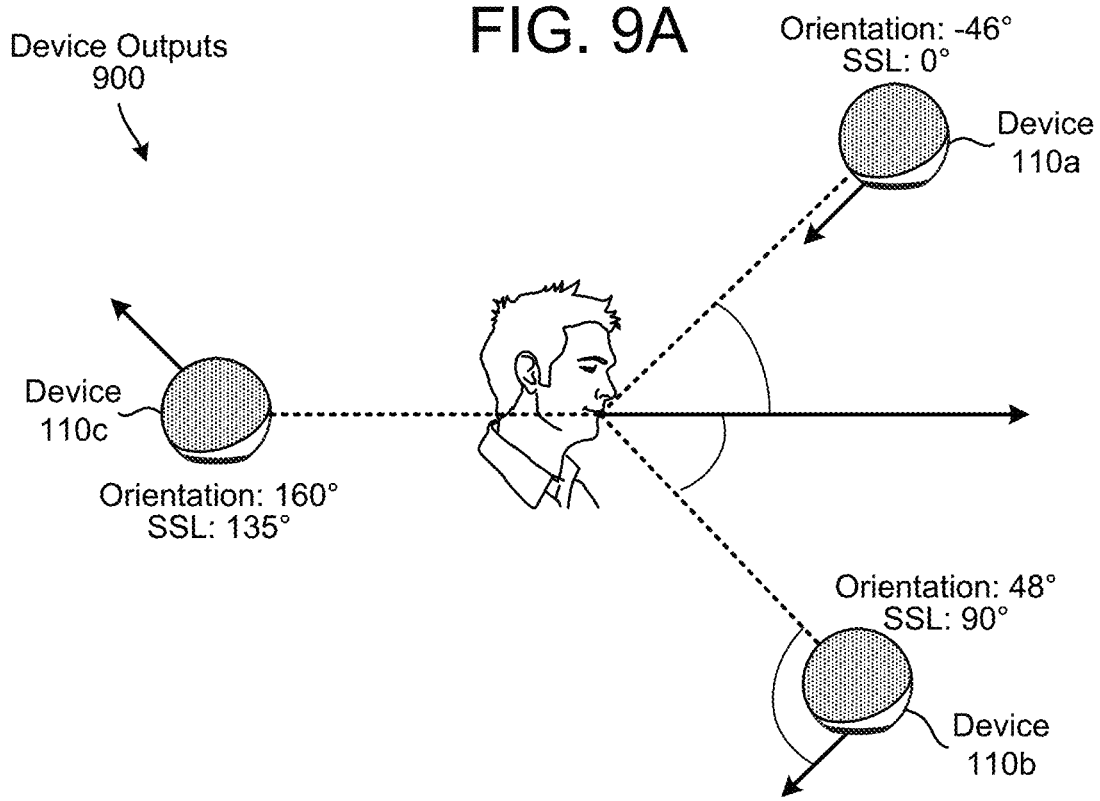
FIGS. 9A-9B illustrate examples of generating individual user orientation estimates and generating a final user orientation estimate according to embodiments of the present disclosure.
Figure 9B:
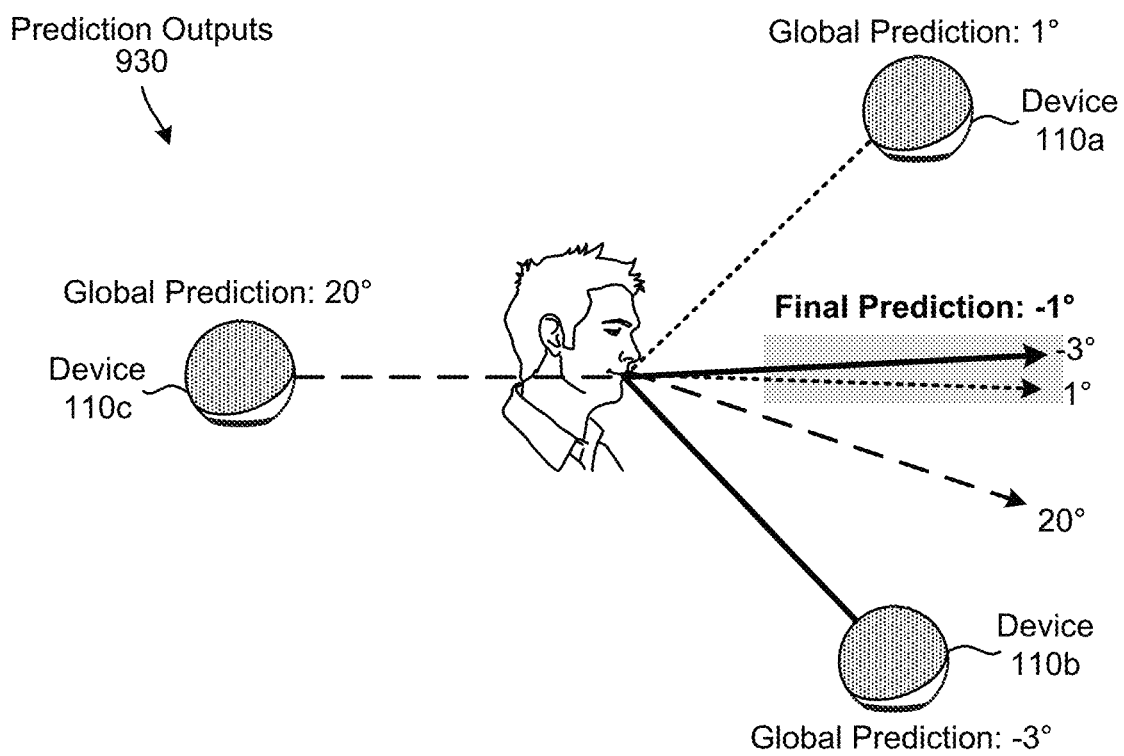

FIGS. 9A-9B illustrate examples of generating individual user orientation estimates and generating a final user orientation estimate according to embodiments of the present disclosure. In the example of device outputs 900 illustrated in FIG. 9A, the first user orientation data 842a is shown as −46°, which indicates that the first device 110a is located 46° in a counter-clockwise direction relative to the first user orientation estimate generated by the first classifier component 840a. In addition, the first SSL data 844a is shown as 0°, which indicates that the user is aligned exactly with the first device orientation axis (e.g., a first orientation of the first device 110a).

The second classifier component 840b may also process the combined feature data 835 to generate second orientation data 842b and second SSL data 844b associated with the second device 110b. For example, the second user orientation data 842b may correspond to a third angle that indicates a direction of the second device 110b with respect to the user's facing direction as estimated by the second device 110*b* (e.g., second user orientation estimate). In contrast, the second SSL data 844*b* may correspond to a fourth angle that indicates a direction of the user with respect to a second device orientation axis of the second device 110*b*.

In the example of device outputs 900 illustrated in FIG. 9A, the second user orientation data 842*b* is shown as 48°, which indicates that the second device 110*b* is located 48° in a clockwise direction relative to the second user orientation estimate generated by the second classifier component 840*b*. In addition, the second SSL data 844*b* is shown as 90°, which indicates that the user is located 90° in a clockwise direction relative to the second device orientation axis (e.g., a second orientation of the second device 110*b*).

The third classifier component 840*c* may also process the combined feature data 835 to generate third orientation data 842*c* and third SSL data 844*c* associated with the third device 110*c*. For example, the third user orientation data 842*c* may correspond to a fifth angle that indicates a direction of the third device 110*c* with respect to the user's facing direction as estimated by the third device 110*c* (e.g., third user orientation estimate). In contrast, the third SSL data 844*c* may correspond to a sixth angle that indicates a direction of the user with respect to a third device orientation axis of the third device 110*c*.

In the example of device outputs 900 illustrated in FIG. 9A, the third user orientation data 842*c* is shown as 160°, which indicates that the third device 110*c* is located 160° in a clockwise direction relative to the third user orientation estimate generated by the third classifier component 840*c*. In addition, the third SSL data 844*c* is shown as 135°, which indicates that the user is located 135° in a clockwise direction relative to the third device orientation axis (e.g., a third orientation of the third device 110*c*).

Referring back to FIG. 8, the post-processing component(s) 850 may receive the orientation data 842*a*-842*c* and/or the SSL data 844*a*-844*c* and may generate the orientation data 855 representing a final user orientation estimate (e.g., global user orientation estimate). However, the user orientation data 842*a*-842*c* indicates a direction of an individual device 110*a*-110*c* relative to the user orientation estimate generated by the respective device 110*a*-110*c*. For example, the first user orientation data 842*a* indicates a direction of the first device 110*a* relative to the first user orientation estimate, the second user orientation data 842*b* indicates a direction of the second device 110*b* relative to the second user orientation estimate, and the third user orientation data 842*c* indicates a direction of the third device 110*c* relative to the third user orientation estimate. Thus, the user orientation data 842 indicates a user orientation with respect to each device 110, which is a relative value.

In some examples, the system 100 may convert from the relative user orientation to a global user orientation (e.g., the user's true facing direction with respect to a coordinate system for the environment) using the azimuth values associated with the device map, which were described above with regard to FIG. 6. For example, the device map indicated that the first device 110*a* was associated with a first azimuth value (e.g., −45°) relative to a positive horizontal axis of the device map, that the second device 110*b* was associated with a second azimuth value (e.g., 45°), and that the third device 110*c* was associated with a third azimuth value (e.g., 180°). These azimuth values are relative to the coordinate system associated with the device map, which may be referred to as a global coordinate system, an absolute coordinate system, and/or the like. Thus, the coordinate system distinguishes the global user orientation from the relative user orientation, which represents the user orientation relative to an orientation of a device (e.g., device orientation).

As illustrated by prediction outputs 930 illustrated in FIG. 9B, the system 100 may use the first azimuth value (e.g., −45°) to convert from the first user orientation data 842*a* (e.g., −46°) to a first global prediction (e.g., −45°−−46°=1°), which indicates the first estimated user orientation using global coordinates. Similarly, the system 100 may use the second azimuth value (e.g., 45°) to convert from the second user orientation data 842*b* (e.g., 48°) to a second global prediction (e.g., 45°−48°=−3°), which indicates the second estimated user orientation using global coordinates. Finally, the system 100 may use the third azimuth value (e.g., 180°) to convert from the third user orientation data 842*c* (e.g., 160°) to a third global prediction (e.g., 180°−160°=20°), which indicates the third estimated user orientation using global coordinates.

In some examples, the system 100 may determine the final user orientation estimate (e.g., orientation data 855) using each of the global predictions. For example, the system 100 may determine the final user orientation estimate by calculating a mean, a weighted sum, and/or the like using the first global prediction, the second global prediction, and the third global prediction without departing from the disclosure. However, the disclosure is not limited thereto, and in other examples the system 100 may determine the final user orientation estimate using only one or two of the global predictions without departing from the disclosure.

In some examples, the system 100 may select similar global predictions and determine the final user orientation estimate by calculating a mean, a weighted sum, and/or the like using the selected global predictions. Thus, depending on the similarity, the system 100 may select two global predictions or all three global predictions without departing from the disclosure. However, the disclosure is not limited thereto, and in other examples the system 100 may select a fixed number of global predictions without departing from the disclosure. For example, if there are N samples per capture (e.g., N devices), the system 100 may select a first number (e.g., N/2+1) of the global predictions that are most similar and calculate an average of the selected global predictions. Thus, the system 100 may select two global predictions when there are three devices, three global predictions when there are four devices, and so on.

FIG. 9B illustrates an example of determining the final user orientation estimate using two of the three global predictions. As illustrated in FIG. 9B, the prediction outputs 930 correspond to the first global prediction (e.g., 1°), the second global prediction (e.g., −3°), and the third global prediction (e.g., 20°). Thus, the first global prediction and the second global prediction are similar to each other and noticeably different than the third global prediction, which is emphasized in FIG. 9B by the grey shading. In this example, the system 100 may determine the final user orientation estimate (e.g., −1°) by averaging the first global prediction and the second global prediction (e.g., [1°+−3°]/2=−1°), although the disclosure is not limited thereto.

While the examples illustrated above refer to the system 100 determining the final user orientation estimate using two or more of the global predictions, the disclosure is not limited thereto. In some examples, the system 100 may determine the final user orientation estimate using only one of the global predictions without departing from the disclosure. For example, the classifier components 840 may be configured to determine a confidence score indicating a likelihood that the orientation data 842 corresponds to the user's actual orientation. In this example, the system 100 may select global predictions associated with a confidence score above a threshold value, which may result in the system 100 selecting a single global prediction if only one confidence score exceeds the threshold value. Additionally or alternatively, the system 100 may associate one of the devices 110 with a higher level of accuracy and may select the global prediction generated by this device 110 without departing from the disclosure. For example, if the third device 110c includes eight microphones while the first device 110a and the second device 110b only include four microphones, the system 100 may associate the third device 110c with a higher level of accuracy than the other two. Thus, while the third global prediction is different than the first global prediction and the second global prediction, the system 100 may determine the final user orientation estimate using the third global prediction without departing from the disclosure.

As described above, the system 100 may generate orientation data using any number of devices 110 without departing from the disclosure. Thus, while FIGS. 8-9B illustrate examples that only includes three devices 110a-110c, this is intended to conceptually illustrate a simple example and the disclosure is not limited thereto. Instead, the system 100 may generate orientation data using three devices 110a-110c, four devices 110a-110d, or even six or more devices without departing from the disclosure. As a practical matter, the only limitation on the number of devices 110 is how many devices can communicate with each other and generate samples during an individual capture. For example, the system 100 may be configured to avoid overlap between captures, such that all of the devices should generate a first sample associated with a first capture before any of the devices generate a second sample associated with a second capture.

In addition to generating the orientation data using any number of devices 110, the system 100 may generate the orientation data using a variety of different types of devices 110 without departing from the disclosure. For example, when the system 100 uses three devices 110a-110c, the devices may correspond to a single type of device (e.g., AAA), two types of device (e.g., AAB or ABB), or three separate types of device (e.g., ABC). Similarly, when the system 100 uses four devices 110a-110d, the devices may correspond to a single type of device (e.g., AAAA), two types of device (e.g., AAAB, AABB, or ABBB), three types of device (e.g., AABC, ABBC, or ABCC), or four separate types of device (e.g., ABCD).

Figure 10:
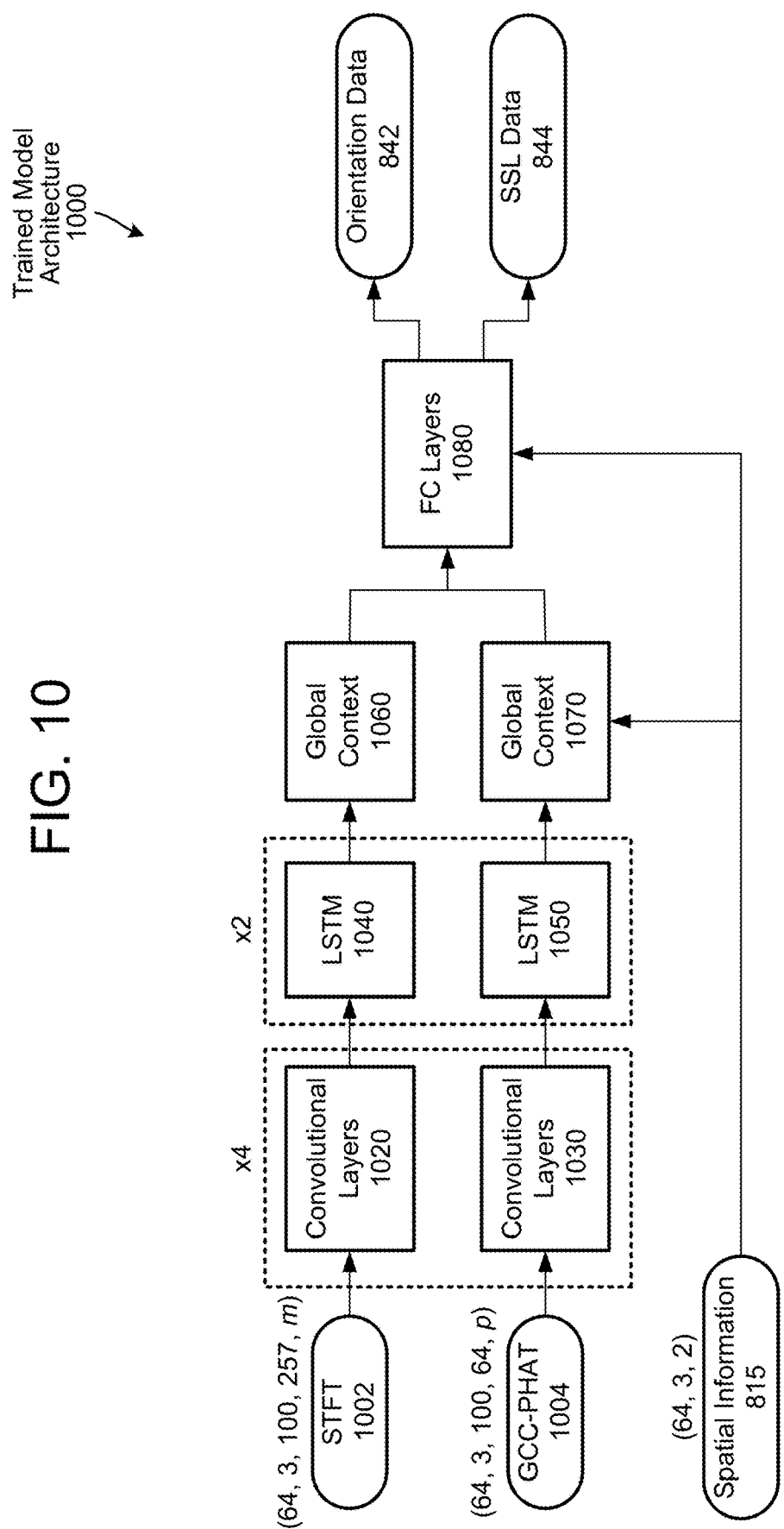
FIG. 10 is a conceptual diagram of components of a trained model configured to perform user orientation estimation according to embodiments of the present disclosure.

FIG. 10 is a conceptual diagram of components of a trained model configured to perform user orientation estimation according to embodiments of the present disclosure. As described above with regard to FIG. 8, the system 100 may perform feature extraction individually on each device 110 and then perform feature encoding 830 to generate feature data 835 that is shared with all of the devices in the group. For example, the first device 110a may perform first feature extraction to generate a first plurality of features, followed by first feature encoding to generate first feature data 835a. Similarly, the second device 110b may perform second feature extraction to generate a second plurality of features, followed by second feature encoding to generate second feature data 835b, and so on.

FIG. 10 illustrates an example of trained model architecture 1000 configured to perform the feature encoding described above. In some examples, an individual device 110 may perform feature extraction to generate a plurality of features, which includes a first portion corresponding to frequency components of the audio data (e.g., STFT data 1002), a second portion corresponding to cross-correlation values of the audio data (e.g., GCC-PHAT data 1004), and a third portion corresponding to the spatial information 815 described above. For example, the device 110 may generate the STFT data 1002 by converting the audio data from the time domain to the frequency domain using short-time Fourier Transforms, although the disclosure is not limited thereto. In addition, the device 110 may generate the GCC-PHAT data 1004 by determining generalized cross-correlation values using the Generalized Cross Correlation with Phase Transform (GCC-PHAT) processing described in greater detail above, although the disclosure is not limited thereto.

As illustrated in FIG. 10, an individual device 110 may process the STFT data 1002, the GCC-PHAT data 1004, and the spatial information 815 to generate the orientation data 842 and the SSL data 844. For example, the STFT data 1002 and the GCC-PHAT data 1004 may be processed using a series of convolutional layers 1020/1030, long short term memory (LSTM) layers 1040/1050, global context layers 1060/1070, and fully-connected (FC) layers 1080. In contrast, the spatial information 815 may be input to the global context layers 1070 and the FC layers 1080.

To illustrate a detailed example, the STFT data 1002 may be processed by convolutional layers 1020 a first number of times (e.g., 4×), followed by LSTM layers 1040 a second number of times (e.g., 2×). Similarly, the GCC-PHAT data 1004 may be processed by convolutional layers 1030 the first number of times (e.g., 4×), followed by the LSTM layers 1050 the second number of times (e.g., 2×). However, while FIG. 10 illustrates the STFT data 1002 and the GCC-PHAT data 1004 being processed the same number of times, the disclosure is not limited thereto and the STFT data 1002 and the GCC-PHAT data 1004 may be processed differently without departing from the disclosure.

The LSTM layers 1040 may generate first STFT features and output the first STFT features to the global context layers 1060. While each device 110 may generate individual STFT features, the global context layers 1060 may combine the STFT features to generate combined STFT features corresponding to the group of devices 110. For example, the first device 110a may generate first STFT features, the second device 110b may generate second STFT features, and the third device 110c may generate third STFT features. Each of the devices 110a-110c may include the global context layers 1060 and the global context layers 1060 may generate combined STFT features using the first STFT features, the second STFT features, and the third STFT features, as will be described in greater detail below with regard to FIG. 11. Thus, the STFT features may be shared between devices within the same capture.

Similarly, the LSTM layers 1050 may generate first cross-correlation features and output the first cross-correlation features to the global context layers 1070. In addition, the global context layers 1070 may receive the spatial information 815 corresponding to the individual device 110. While each device 110 may generate individual cross-correlation features and spatial information 815, the global context layers 1070 may combine the cross-correlation features and the spatial information 815 to generate combined cross-correlation features corresponding to the group of devices 110. For example, the first device 110a may generate first cross-correlation features, the second device 110b may generate second cross-correlation features, and the third device 110c may generate third cross-correlation features. Each of the devices 110a-110c may include the global context layers 1070 and the global context layers 1070 may generate combined cross-correlation features using the first cross-correlation features, the second cross-correlation features, and the third cross-correlation features, as will be described in greater detail below with regard to FIG. 11. Thus, the cross-correlation features may be shared between devices within the same capture.

As illustrated in FIG. 10, the FC layers 1080 may receive the combined STFT features and the combined cross-correlation features, along with the spatial information 815, and may process these inputs to generate the orientation data 842 and the SSL data 844.

FIG. 11 is a conceptual diagram of components of feature encoding architecture configured to perform feature encoding according to embodiments of the present disclosure. The feature encoding architecture 1100 builds off of the trained model architecture 1000 described above while providing additional details. For example, FIG. 11 illustrates that the STFT data 1002 may be processed by a normalization layer 1110 (e.g., Layer Norm) prior to the convolutional layers 1020, while the GCC-PHAT data 1004 may be processed by a normalization layer 1112 (e.g., Layer Norm) prior to the convolutional layers 1030.

In addition, the feature encoding architecture 1100 illustrates details associated with the convolutional layers 1020/1030. For example, the convolutional layers 1020 may comprise three layers, such as a first layer (e.g., time-distributed two-dimensional (2D) convolutional layer 1122), a second layer (e.g., batch normalization and rectified linear unit (Relu) 1124), and a third layer (e.g., MaxPool 1126). As described above with regard to FIG. 10, the convolutional layers 1020 may repeat the first number of times (e.g., 4×), such that the output of the third layer may be input to the first layer three times and then on a fourth iteration the output of the third layer may be sent the LSTM layers 1040.

Similarly, the convolutional layers 1030 may comprise three layers, such as a first layer (e.g., time-distributed two-dimensional (2D) convolutional layer 1132), a second layer (e.g., batch normalization and rectified linear unit (Relu) 1134), and a third layer (e.g., MaxPool 1136). As described above with regard to FIG. 10, the convolutional layers 1030 may repeat the first number of times (e.g., 4×), such that the output of the third layer may be input to the first layer three times and then on a fourth iteration the output of the third layer may be sent the LSTM layers 1050.

As illustrated in FIG. 11, the LSTM layers 1040/1050 may be bi-directional LSTM layers and may send an output to two different layers within the global context layers 1060/1070. For example, the LSTM layers 1040 may send the first STFT features to both a first layer (e.g., Reduce Sum 1162) and a second layer (e.g., Concatenate 1164) included in the global context layers 1060. Thus, the first layer may reduce sum across the device axis and the second layer may concatenate this output with the first STFT features, which operates similar to performing a normalization operation for the STFT features. Using these two layers, the global context layers 1060 may output the combined STFT features described above with regard to FIG. 10.

Similarly, the LSTM layers 1050 may send the first cross-correlation features to both a first layer (e.g., LSTM layer 1172) and a second layer (e.g., Concatenate 1174) included in the global context layers 1070. The LSTM layer 1172 may be a bidirectional LSTM across the device axis, which may also receive spatial features generated by dense layer 1114. For example, the spatial information 815 may be input to a time distributed dense layer 1114, which may output the spatial features to the LSTM layer 1172. Thus, the LSTM layer 1172 may send an output to the concatenate layer 1174, which may concatenate this output with the first cross-correlation features received from the LSTM layers 1050. Using these two layers, the global context layers 1070 may output the combined cross-correlation features described above with regard to FIG. 10.

Finally, a concatenate layer 1176 may receive the combined STFT features from the global context layers 1060 and the combined cross-correlation features from the global context layers 1070 and may generate combined features for all of the devices included in the same capture. The concatenate layer 1176 may send the combined features to the FC layers 1080 along a first path (e.g., "A"). In addition, the dense layer 1114 may output the spatial features to the FC layers 1080 along a second path (e.g., "B").

Figure 12:
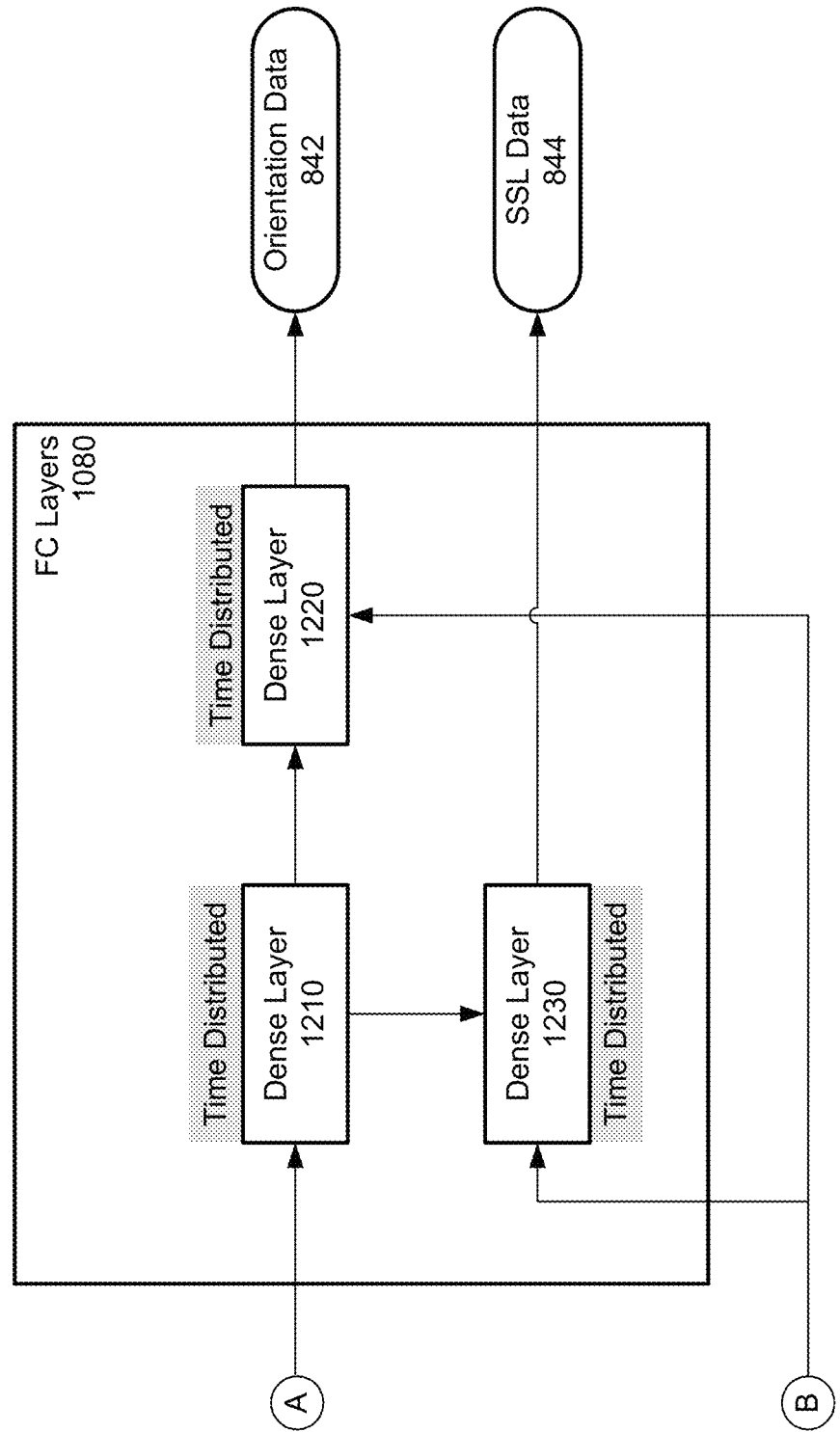
FIG. 12 is a conceptual diagram of components of a classifier architecture configured to perform user orientation estimation according to embodiments of the present disclosure.

FIG. 12 is a conceptual diagram of components of a classifier architecture configured to perform user orientation estimation according to embodiments of the present disclosure. As illustrated in FIG. 12, classifier architecture 1200 illustrates details associated with the FC layers 1080. For example, the FC layers 1080 may comprise three time distributed dense layers 1210/1220/1230, with the first dense layer 1210 and the second dense layer 1220 configured to generate the orientation data 842 and the third dense layer 1230 configured to generate the SSL data 844.

To illustrate an example, the first dense layer 1210 may receive the combined features from the concatenate layer 1176 along the first path (e.g., "A") and may generate a first output that is sent to both the second dense layer 1220 and the third dense layer 1230. The second dense layer 1220 may receive the first output from the first dense layer 1210 along with the spatial features from the dense layer 1114 along the second path (e.g., "B"). Thus, the second dense layer 1220 may process the first output and the spatial features to generate the orientation data 842. Similarly, the third dense layer 1230 may receive the first output from the first dense layer 1210 along with the spatial features from the dense layer 1114 along the second path (e.g., "B"). Thus, the third dense layer 1230 may process the first output and the spatial features to generate the SSL data 844.

As described above with regard to FIG. 8, each device included in the same capture may generate individual orientation data 842 and SSL data 844. For example, each device may include an individual feature encoding component 830, which may correspond to the feature encoding architecture 1100 illustrated in FIG. 11, and an individual classifier 840, which may correspond to the classifier architecture 1200 illustrated in FIG. 12, although the disclosure is not limited thereto.

While the examples illustrated above refer to the system 100 determining the final user orientation estimate using two or more of the global predictions, the disclosure is not limited thereto. In some examples, the system 100 may determine the final user orientation estimate using only one of the global predictions without departing from the disclosure. For example, the classifier components 840 may be configured to determine a confidence score indicating a likelihood that the orientation data 842 corresponds to the user's actual orientation. In this example, the system 100 may select global predictions associated with a confidence score above a threshold value, which may result in the system 100 selecting a single global prediction if only one confidence score exceeds the threshold value. Additionally or alternatively, the system 100 may associate one of the devices 110 with a higher level of accuracy and may select the global prediction generated by this device 110 without departing from the disclosure. For example, if the third device 110c includes eight microphones while the first device 110a and the second device 110b only include four microphones, the system 100 may associate the third device 110c with a higher level of accuracy than the other two. Thus, while the third global prediction is different than the first global prediction and the second global prediction, the system 100 may determine the final user orientation estimate using the third global prediction without departing from the disclosure.

As described above, the system 100 may generate orientation data using any number of devices 110 without departing from the disclosure. Thus, while FIGS. 8-9B illustrate examples that only includes three devices 110a-110c, this is intended to conceptually illustrate a simple example and the disclosure is not limited thereto. Instead, the system 100 may generate orientation data using three devices 110a-110c, four devices 110a-110d, or even six or more devices without departing from the disclosure. As a practical matter, the only limitation on the number of devices 110 is how many devices can communicate with each other and generate samples during an individual capture. For example, the system 100 may be configured to avoid overlap between captures, such that all of the devices should generate a first sample associated with a first capture before any of the devices generate a second sample associated with a second capture.

In addition to generating the orientation data using any number of devices 110, the system 100 may generate the orientation data using a variety of different types of devices 110 without departing from the disclosure. For example, when the system 100 uses three devices 110a-110c, the devices may correspond to a single type of device (e.g., AAA), two types of device (e.g., AAB or ABB), or three separate types of device (e.g., ABC). Similarly, when the system 100 uses four devices 110a-110d, the devices may correspond to a single type of device (e.g., AAAA), two types of device (e.g., AAAB, AABB, or ABBB), three types of device (e.g., AABC, ABBC, or ABCC), or four separate types of device (e.g., ABCD).

In some examples, the system 100 may need to support each individual configuration and perform training specific to the individual configuration. For example, when the system 100 uses three devices 110a-110c, the system 100 may perform training on a minimum of the three different groupings described above based on the number of different types of devices. However, this assumes that the system 100 may perform training once for each unique grouping of device types, without regard to the individual device types that are included in a potential grouping. For example, if the system 100 is configured to support three different types of device (e.g., A, B, or C), this assumption requires that the system 100 be capable of performing training once for any combination of two different types of device, which includes AAB, AAC, BBA, BBC, CCA, or CCB.

This may not be effective and/or accurate, however, and in other examples the system 100 may be required to perform separate training for each individual device configuration without departing from the disclosure. For example, instead of performing training once for all possible combinations of two different types of device, the system 100 may need to perform training separately for each of the six device configurations listed above. Thus, supporting three different types of device may require separate training for ten unique device configurations (e.g., AAA, BBB, CCC, AAB, AAC, BBA, BBC, CCA, CCB, and ABC). Similarly, supporting a fourth type of device (e.g., D) may require separate training for twenty unique device configurations, which includes ten new device configurations (e.g., DDD, AAD, BBD, CCD, DDA, DDB, DDC, ABD, ACD, and BCD), supporting a fifth type of device (e.g., E) may require separate training for 35 unique device configurations, and so on. However, the disclosure is not limited thereto, and the system 100 may implement a training framework that is configured to extend the training to similar configurations and/or to minimize the amount of retraining required when supporting an additional type of device without departing from the disclosure.

Figure 13:
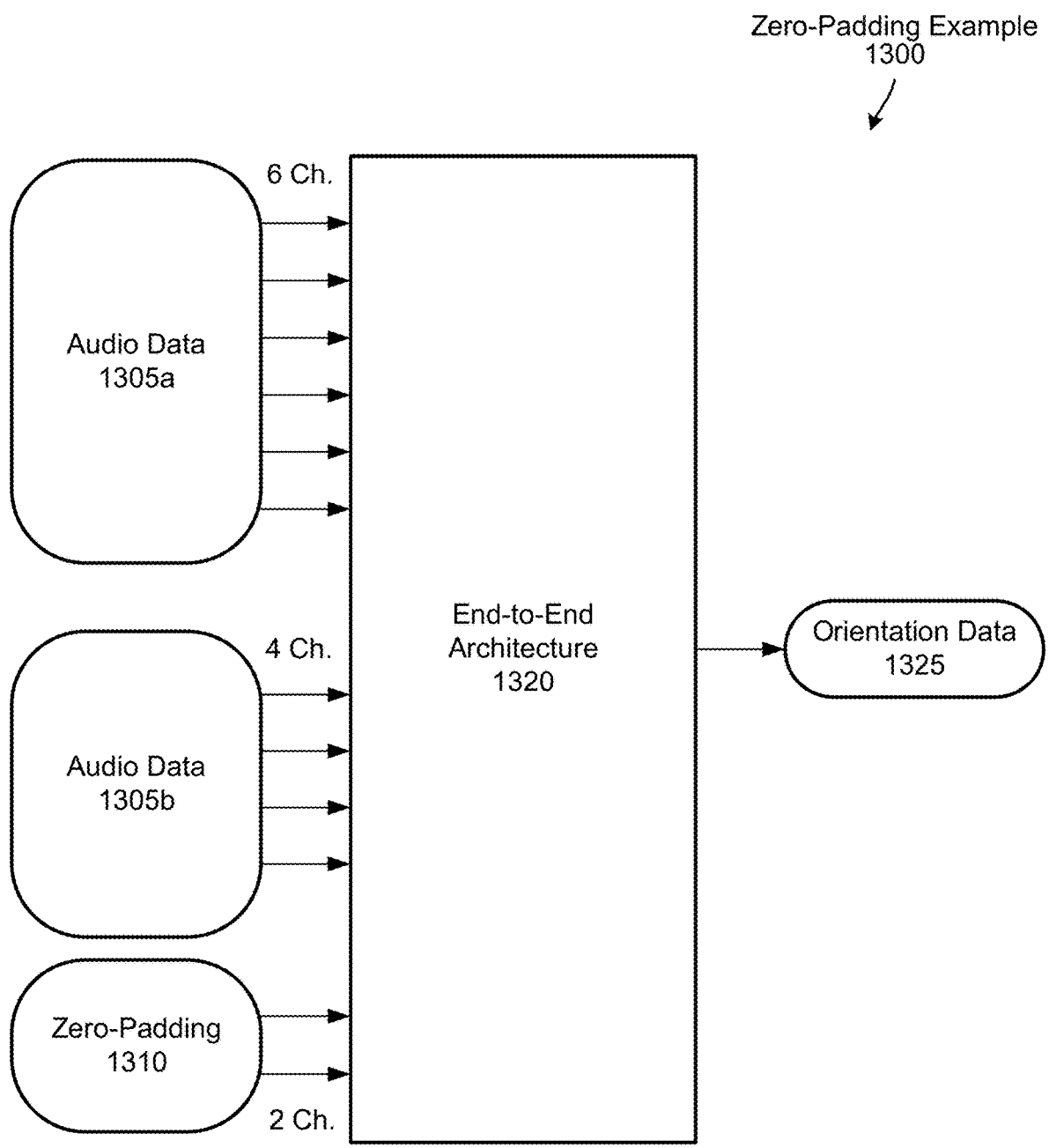
FIG. 13 illustrates an example of processing different types of devices according to embodiments of the present disclosure.

FIG. 13 illustrates an example of processing different types of devices according to embodiments of the present disclosure. In some examples, the system 100 may perform zero-padding to account for differences in a number of microphone channels between two devices 110. As illustrated in FIG. 13, a first device 110a may generate first audio data 1305a associated with a first number of channels (e.g., six channels corresponding to six microphones), while a second device 110b may generate second audio data 1305b associated with a second number of channels (e.g., four channels corresponding to four microphones).

To process the first audio data 1305a and the second audio data 1305b despite the different number of channels, the system 100 may modify the second audio data 1305b to have the first number of channels by performing zero padding. As illustrated in the zero-padding example 1300, the system 100 may perform zero-padding 1310 to add two additional channels to the second audio data 1305b. As a result of the zero-padding 1310, end-to-end architecture 1320 may be capable of processing the first number of channels associated with the first audio data 1305a (e.g., six microphone channels) and the first number of channels associated with the second audio data 1305b (e.g., four microphone channels and two zero-padded channels) in order to generate orientation data 1325.

While FIG. 13 illustrates an example in which the system 100 performs zero padding to add two channels, the disclosure is not limited thereto. The system 100 may perform zero padding using a variety of techniques without departing from the disclosure, such that the system 100 may add any number of zero-padded channels to enable the end-to-end architecture 1320 to handle audio data 1305 having a different number of channels. Additionally or alternatively, instead of performing zero padding, the system 100 may duplicate random channels to make the number of channels equal for all of the devices 110 without departing from the disclosure.

Figure 14A:
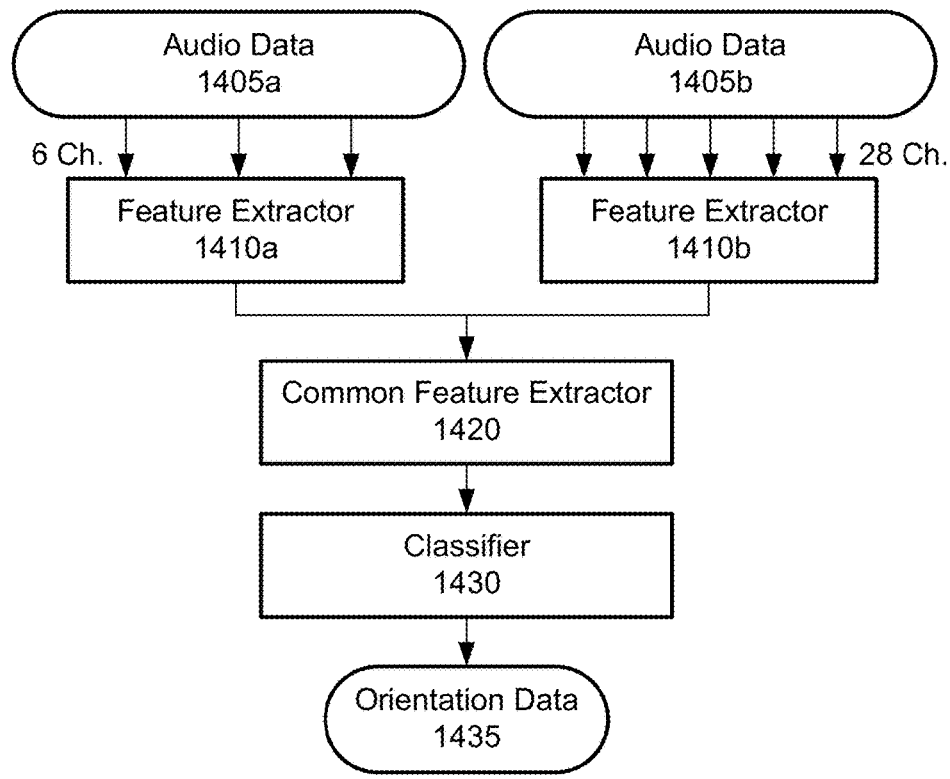
Figure 14B:
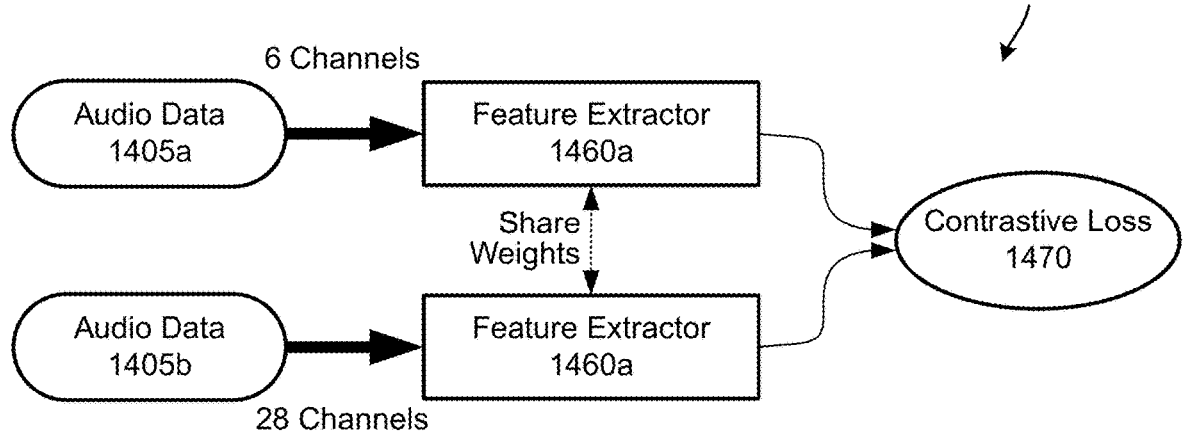

FIGS. 14A-14B illustrate examples of processing different types of devices according to embodiments of the present disclosure. In some examples, the system 100 may include dynamic architecture that can change during runtime to accommodate a varying number of microphone channels. For example, FIG. 14A illustrates a dynamic architecture example 1400 in which the system 100 may perform feature extraction using two stages, with a first stage performing first feature extraction specific to a particular type of device (e.g., device type, model, and/or the like), and a second stage performing second feature extraction uniformly for all device types. Thus, the first stage may comprise two or more feature extractor components 1410 corresponding to the types of devices supported by the system 100 and the system 100 may process each type of device using a separate feature extractor component 1410.

In the dynamic architecture example 1400 illustrated in FIG. 14A, a first feature extractor component 1410a may be trained specifically for a first type of device associated with six microphones, while a second feature extractor component 1410b may be trained specifically for a second type of device associated with four microphones, although the disclosure is not limited thereto. For example, the first feature extractor component 1410a may process first audio data 1405a, which may correspond to six channels generated by a single device. In contrast, the second feature extractor component 1410b may process second audio data 1405b, which may correspond to 28 channels generated by seven devices. The first feature extractor component 1410a may process the first audio data 1405a to generate a first plurality of features and the second feature extractor component 1410b may process the second audio data 1405b to generate a second plurality of features.

As illustrated in FIG. 14A, the second stage may correspond to a common feature extractor component 1420 that is configured to perform feature extraction uniformly regardless of the type of device or the number of channels. For example, the common feature extractor component 1420 may process the first plurality of features and the second plurality of features to generate feature data including a third plurality of features. Finally, a classifier component 1430 may process the feature data to generate orientation data 1435, as described in greater detail above with regard to FIG. 8.

In the dynamic architecture example 1400, only the first stage (e.g., feature extractor components 1410) would be different for different types of devices. During training, the system 100 may freeze the feature extractor components 1410 and back propagate gradients through the other layers first, although the disclosure is not limited thereto.

In contrast to the dynamic architecture example 1400 illustrated in FIG. 14A, FIG. 14B illustrates a Siamese network example 1450 that is configured to be invariant to microphone geometry. For example, if the position of the device 110, position of the user, and orientation of the user remains the same, then the feature embedding should be similar regardless of the type of device 110.

As illustrated in FIG. 14B, the Siamese network example 1450 may include a first feature extractor component 1460a configured to process first audio data 1405a, which may correspond to six channels generated by a single device. In contrast, the second feature extractor component 1460b may be configured to process second audio data 1405b, which may correspond to 28 channels generated by seven devices. The first feature extractor component 1460a and the second feature extractor component 1460b may share weights that may vary based on contrastive loss 1470.

Figure 15A:
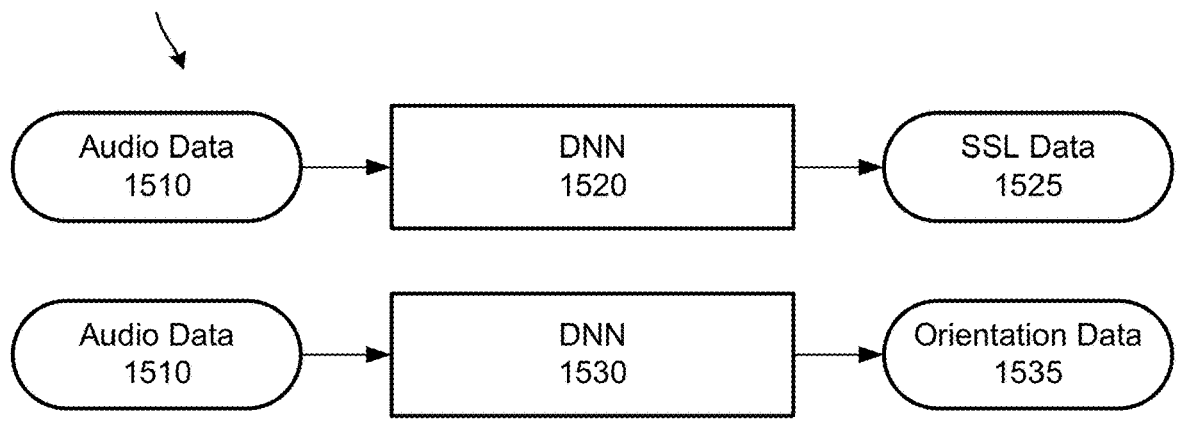
FIGS. 15A-15C illustrate examples of different trained models according to embodiments of the present disclosure.
Figure 15B:
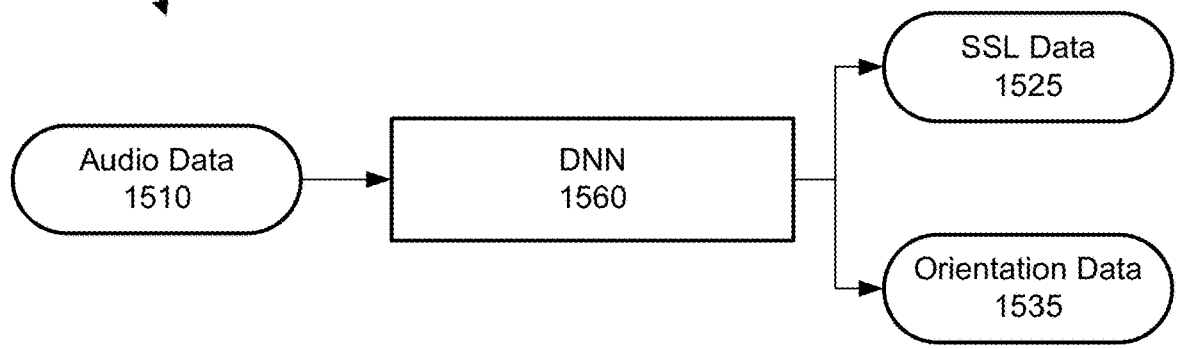
Figure 15C:
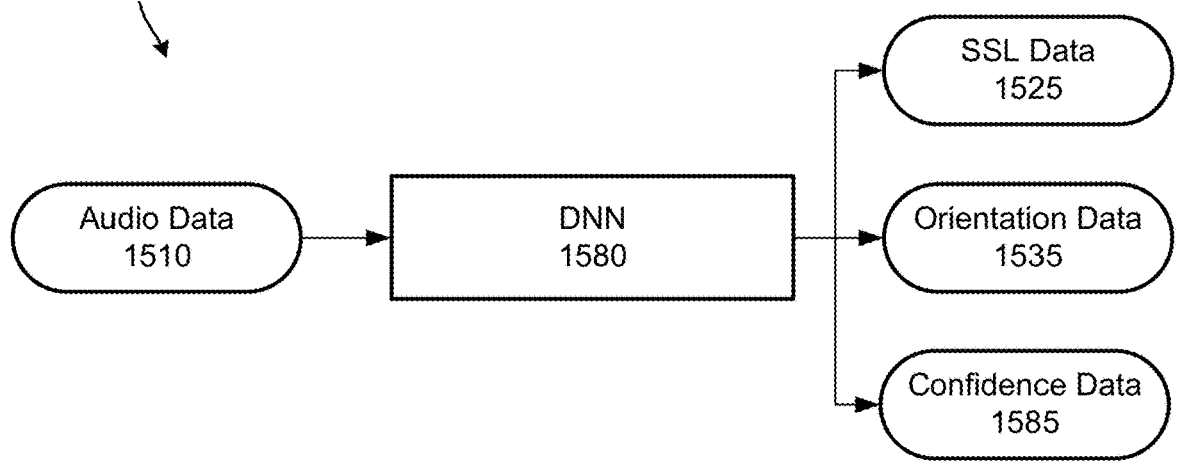

FIGS. 15A-15C illustrate examples of different trained models according to embodiments of the present disclosure. As illustrated in FIG. 15A, in some examples the system 100 may include two different deep neural network (DNN) components, with a first DNN component configured to generate SSL data and a second DNN component configured to generate orientation data. For example, a first DNN component 1520 may be configured to process audio data 1510 and generate SSL data 1525, while a second DNN component 1530 may be configured to separately process the audio data 1510 and generate orientation data 1535, as illustrated by a separate model example 1500.

In contrast, FIG. 14B illustrates a unified model example 1550 in which a single DNN component 1560 may process the audio data 1510 and generate the SSL data 1525 and the orientation data 1535. In some examples, the system 100 may also generate a confidence score indicating a likelihood that the orientation data 1535 corresponds to the user. For example, FIG. 14C illustrates a unified model example 1570 in which a single DNN component 1580 may process the audio data 1510 and generate the SSL data 1525, the orientation data 1535, and confidence data 1585. The system 100 may use the confidence data 1585 to select between the orientation data 1535 generated by different devices 110 without departing from the disclosure.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 16:
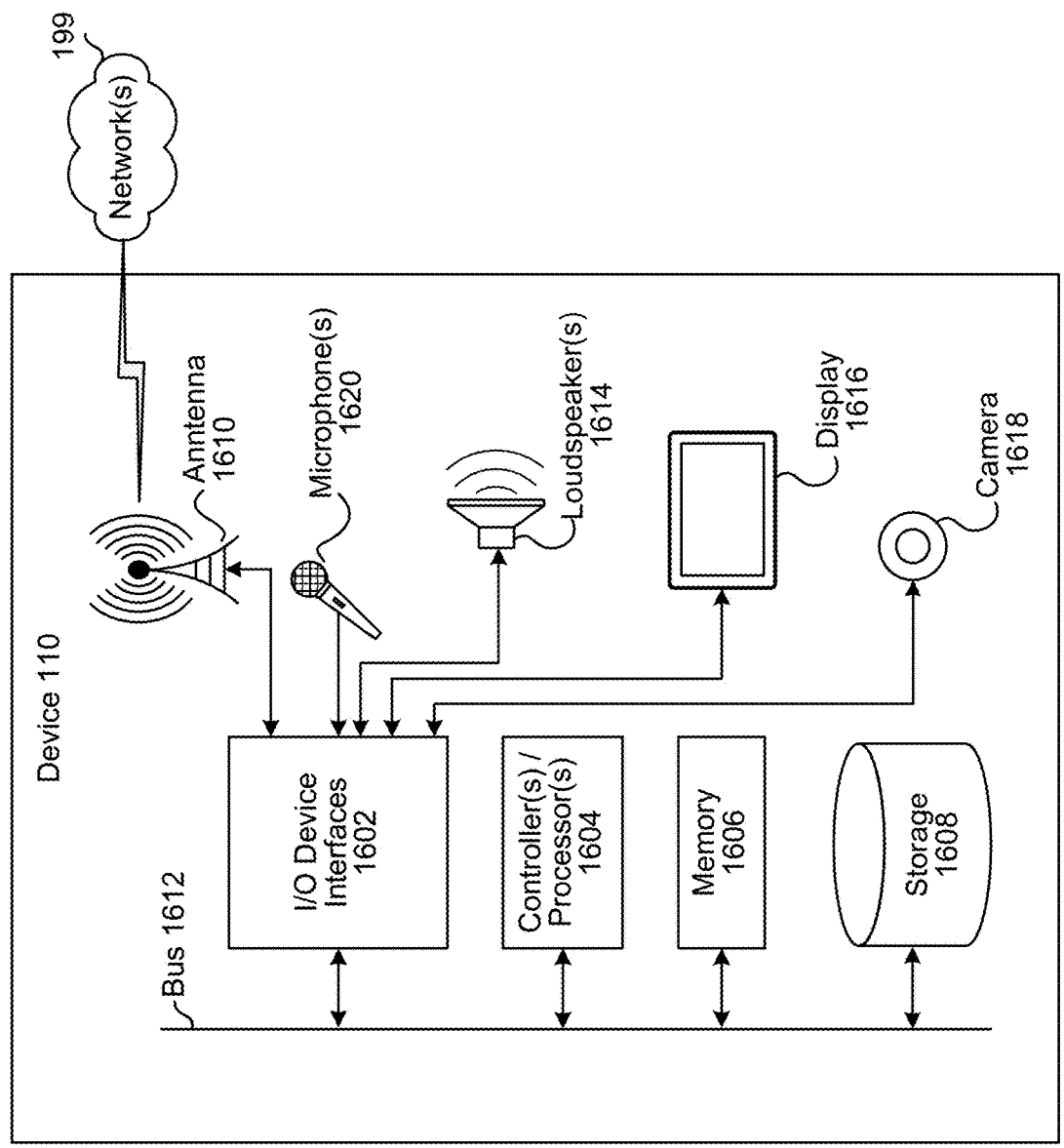
FIG. 16 is a block diagram conceptually illustrating example components of a device, according to embodiments of the present disclosure.
Figure 17:
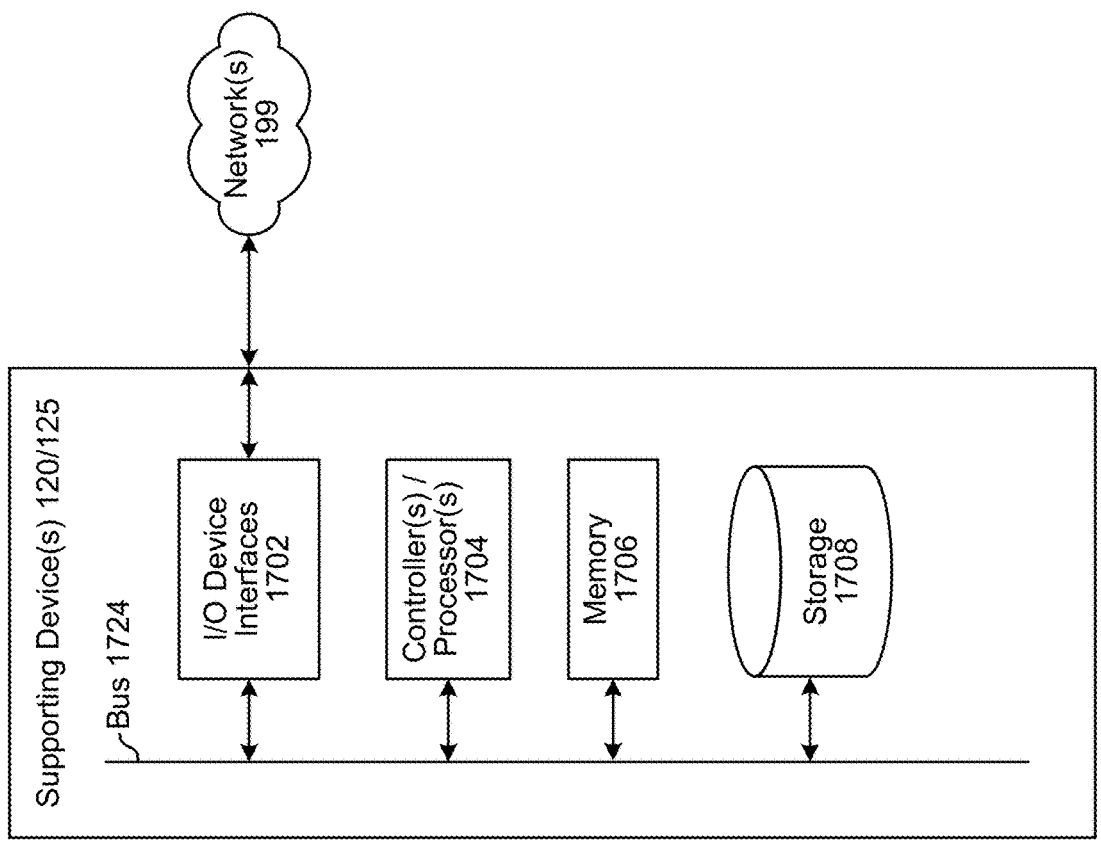
FIG. 17 is a block diagram conceptually illustrating example components of a system, according to embodiments of the present disclosure.

FIG. 16 is a block diagram conceptually illustrating a device 110 that may be used with the system. FIG. 17 is a block diagram conceptually illustrating example components of a remote device, such as the supporting device(s) 120, which may assist with ASR processing, NLU processing, etc., and skill device(s) 125. The device(s) (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing supporting device(s) 120 for performing ASR processing, one or more natural language processing supporting device(s) 120 for performing NLU processing, one or more skill device(s) 125, etc. In operation, each of these systems may include computer-readable and computer-executable instructions that reside on the respective device (120/125), as will be discussed further below.

The supporting device(s) 120 may correspond to cloud devices that operates at a location not proximate to device 110. The supporting device(s) 120 may also operate at a similar location to device 110, though perhaps in a different physical device such as a home server, edge server, or the like. The supporting device(s) 120 may also be a distributed system where certain components/operations occur using device(s) at one location and other components/operations occur using device(s) at another location.

Each of these devices (110/120/125) may include one or more controllers/processors (1604/1704), which may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive memory (MRAM), and/or other types of memory. Each device (110/120/125) may also include a data storage component (1608/1708) for storing data and controller/processor-executable instructions. Each data storage component (1608/1708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1602/1702).

Computer instructions for operating each device (110/120/125) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120/125) includes input/output device interfaces (1602/1702). A variety of components may be connected through the input/output device interfaces (1602/1702), as will be discussed further below. Additionally, each device (110/120/125) may include an address/data bus (1624/1724) for conveying data among components of the respective device. Each component within a device (110/120/125) may also be directly connected to other components in addition to (or instead of) being connected to other components across the bus (1624/1724).

Referring to FIG. 16, the device 110 may include input/output device interfaces 1602 that connect to a variety of components such as an audio output component such as a speaker 1612, a wired headset or a wireless headset (not illustrated), or other component capable of outputting audio. The device 110 may also include an audio capture component. The audio capture component may be, for example, a microphone 1620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. An array of microphones may also be used to perform beamforming/other techniques to determine a direction of a sound's point of origin relative to the device 110. Data from the array of microphones as well as other components may be used to track a sound's source as it moves around an environment of a device 110. The device 110 may additionally include a display 1616 for displaying content. The device 110 may further include a camera 1618.

Via antenna(s) 1622, the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1602/1702) may also include communication components that allow data to be exchanged between devices such as different physical servers in a collection of servers or other components.

The components of the device(s) 110, the supporting device(s) 120, or skill device(s) 125 may include their own dedicated processors, memory, and/or storage. Alternatively, one or more of the components of the device(s) 110, the supporting device(s) 120, or skill device(s) 125 may utilize the I/O interfaces (1602/1702), processor(s) (1604/1704), memory (1606/1706), and/or storage (1608/1708) of the device(s) 110, supporting device(s) 120, or the skill device(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the supporting device(s) 120, and skill device(s) 125, as described herein, are illustrative, and may be located as a stand-alone device or may be included, in whole or in part, as a component of a larger device or system.

As illustrated in FIG. 18, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a smart phone 110a, speech-detection device(s) with display 110b, speech-detection device(s) 110c, a tablet computer 110d, an input/output (I/O) limited device 110e, a smart television 110f, and/or a motile device 110g may be connected to the network(s) 199 through a wireless service provider, over a WiFi or cellular network connection, or the like. Other devices are included as network-connected support devices, such as the supporting device(s) 120, the skill device(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250/350, the NLU component 260/360, etc.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by a first device, first audio data corresponding to audio captured by at least one microphone of the first device, the first audio data representing speech input associated with a first user;
   determining first spatial data that represents a first distance between the first device and the first user and a first angle of the first device relative to a second device;
   determining, using the first audio data, a first plurality of feature values associated with the speech input;
   generating first feature data that includes the first spatial data and the first plurality of feature values;
   receiving, from the second device, second feature data associated with the second device, the second feature data including a second distance between the second device and the first user along with a second plurality of feature values determined by the second device; and
   determining, by a first trained model, first user orientation data using the first feature data and the second feature data, the first user orientation data indicating a first estimated direction associated with the first user relative to a coordinate system.

2. The computer-implemented method of claim 1, further comprising:
   receiving, from the second device, second user orientation data indicating a second estimated direction associated with the first user relative to the coordinate system;
   receiving, from a third device, third user orientation data indicating a third estimated direction associated with the first user relative to the coordinate system; and
   determining fourth user orientation data using at least two of the first user orientation data, the second user orientation data, and the third user orientation data, the fourth user orientation data indicating a fourth estimated direction associated with the first user relative to the coordinate system.

3. The computer-implemented method of claim 1, wherein determining the first user orientation data further comprises:
   determining, by the first trained model, using the first feature data and the second feature data, the first user orientation data and first data, the first data indicating a second angle of the first user relative to a first orientation of the first device.

4. The computer-implemented method of claim 1, further comprising:
   determining, by the first trained model, first confidence data using the first feature data and the second feature data, the first confidence data indicating a likelihood that the first user is facing the first estimated direction;
   determining, using the first confidence data, a first weight value associated with the first user orientation data; and
   determining second user orientation data using the first user orientation data and the first weight value, the second user orientation data indicating a second estimated direction associated with the first user relative to the coordinate system.

5. The computer-implemented method of claim 1, further comprising, by the second device:
generating second audio data representing the speech input;
determining second spatial data that includes the second distance;
determining, using the second audio data, the second plurality of feature values associated with the speech input;
generating the second feature data that includes the second spatial data and the second plurality of feature values;
sending, to the first device, the second feature data;
receiving, from the first device, the first feature data; and
determining second user orientation data using the first feature data and the second feature data, the second user orientation data indicating a second estimated direction associated with the first user relative to the coordinate system.

6. The computer-implemented method of claim 1, further comprising:
determining that the first audio data corresponds to a first number of channels;
determining that the second feature data corresponds to a second number of channels that exceeds the first number of channels; and
determining a third number of channels corresponding to a difference between the second number of channels and the first number of channels,
wherein the first plurality of feature values are determined using the first audio data that is zero-padded with the third number of channels.

7. The computer-implemented method of claim 1, wherein:
the first plurality of feature values represents first frequency components of the first audio data;
the second plurality of feature values represents second frequency components of second audio data generated by the second device; and
the first plurality of feature values includes more high frequency content than the second plurality of feature values, indicating that the first user is facing towards the first device relative to the second device.

8. The computer-implemented method of claim 1, further comprising:
determining a first value by calculating a first cross-correlation between a first channel of the first audio data and a second channel of the first audio data; and
determining a second value by calculating a second cross-correlation between the first channel of the first audio data and a third channel of the first audio data, wherein the first value and the second value are part of the first plurality of feature values.

9. The computer-implemented method of claim 1, wherein determining the first spatial data further comprises:
determining that the first device is the first distance from the first user;
determining that the second device is a third distance from the first user;
determining that the third distance is less than the first distance;
determining a ratio of the first distance to the third distance;
determining a second angle of the first device relative to the first user;
determining a third angle of the second device relative to the first user; and
determining the first angle by subtracting the third angle from the second angle.

10. The computer-implemented method of claim 1, further comprising:
determining, using the first audio data and a first feature extraction component, a third plurality of feature values associated with the speech input;
determining, using the third plurality of feature values and a second feature extraction component, the first plurality of feature values;
generating, by the second device, second audio data representing the speech input;
determining, using the second audio data and a third feature extraction component, a fourth plurality of feature values associated with the speech input; and
determining, using the fourth plurality of feature values and the second feature extraction component, the second plurality of feature values.

11. A system comprising:
at least one processor; and
memory including instructions operable to be executed by the at least one processor to cause the system to:
receive, by a first device, first audio data corresponding to audio captured by at least one microphone of the first device, the first audio data representing speech input associated with a first user;
determine first spatial data that represents a first distance between the first device and the first user and a first angle of the first device relative to a second device;
determine, using the first audio data, a first plurality of feature values associated with the speech input;
generate first feature data that includes the first spatial data and the first plurality of feature values;
receive, from the second device, second feature data associated with the second device, the second feature data including a second distance between the second device and the first user along with a second plurality of feature values determined by the second device; and
determine, by a first trained model, first user orientation data using the first feature data and the second feature data, the first user orientation data indicating a first estimated direction associated with the first user relative to a coordinate system.

12. The system of claim 11, wherein the memory further comprises instructions that, when executed by the at least one processor, further cause the system to:
receive, from the second device, second user orientation data indicating a second estimated direction associated with the first user relative to the coordinate system;
receive, from a third device, third user orientation data indicating a third estimated direction associated with the first user relative to the coordinate system; and
determine fourth user orientation data using at least two of the first user orientation data, the second user orientation data, and the third user orientation data, the fourth user orientation data indicating a fourth estimated direction associated with the first user relative to the coordinate system.

13. The system of claim 11, wherein the memory further comprises instructions that, when executed by the at least one processor, further cause the system to:
determine, by the first trained model, using the first feature data and the second feature data, the first user orientation data and first data, the first data indicating a second angle of the first user relative to a first orientation of the first device.

14. The system of claim 11, wherein the memory further comprises instructions that, when executed by the at least one processor, further cause the system to:
determine, by the first trained model, first confidence data using the first feature data and the second feature data, the first confidence data indicating a likelihood that the first user is facing the first estimated direction;
determine, using the first confidence data, a first weight value associated with the first user orientation data; and
determine second user orientation data using the first user orientation data and the first weight value, the second user orientation data indicating a second estimated direction associated with the first user relative to the coordinate system.

15. The system of claim 11, wherein the memory further comprises instructions that, when executed by the at least one processor, further cause the system to:
generate, by the second device, second audio data representing the speech input;
determine second spatial data that includes the second distance;
determine, using the second audio data, the second plurality of feature values associated with the speech input;
generate the second feature data that includes the second spatial data and the second plurality of feature values;
send, to the first device, the second feature data;
receive, from the first device, the first feature data; and
determine second user orientation data using the first feature data and the second feature data, the second user orientation data indicating a second estimated direction associated with the first user relative to the coordinate system.

16. The system of claim 11, wherein the memory further comprises instructions that, when executed by the at least one processor, further cause the system to:
determine that the first audio data corresponds to a first number of channels;
determine that the second feature data corresponds to a second number of channels that exceeds the first number of channels; and
determine a third number of channels corresponding to a difference between the second number of channels and the first number of channels,
wherein the first plurality of feature values are determined using the first audio data that is zero-padded with the third number of channels.

17. The system of claim 11, wherein:
the first plurality of feature values represent frequency components of the first audio data;
the second plurality of feature values represents second frequency components of second audio data generated by the second device; and
the first plurality of feature values includes more high frequency content than the second plurality of feature values, indicating that the first user is facing towards the first device relative to the second device.

18. The system of claim 11, wherein the memory further comprises instructions that, when executed by the at least one processor, further cause the system to:
determine a first value by calculating a first cross-correlation between a first channel of the first audio data and a second channel of the first audio data; and
determine a second value by calculating a second cross-correlation between the first channel of the first audio data and a third channel of the first audio data, wherein the first value and the second value are part of the first plurality of feature values.

19. The system of claim 11, wherein the memory further comprises instructions that, when executed by the at least one processor, further cause the system to:
determine that the first device is the first distance from the first user;
determine that the second device is a third distance from the first user;
determine that the third distance is less than the first distance;
determine a ratio of the first distance to the third distance;
determine a second angle of the first device relative to the first user;
determine a third angle of the second device relative to the first user; and
determine the first angle by subtracting the third angle from the second angle.

20. The system of claim 11, wherein the memory further comprises instructions that, when executed by the at least one processor, further cause the system to:
determine, using the first audio data and a first feature extraction component, a third plurality of feature values associated with the speech input;
determine, using the third plurality of feature values and a second feature extraction component, the first plurality of feature values;
generate, by the second device, second audio data representing the speech input;
determine, using the second audio data and a third feature extraction component, a fourth plurality of feature values associated with the speech input; and
determine, using the fourth plurality of feature values and the second feature extraction component, the second plurality of feature values.

* * * * *